US012579464B1

(12) United States Patent
Wang et al.

(10) Patent No.: US 12,579,464 B1
(45) Date of Patent: Mar. 17, 2026

(54) META-MODELS FOR PREDICTING MACHINE LEARNING MODEL PERFORMANCE USING FEATURES OBTAINED VIA OPTIMIZATION

(71) Applicant: Amazon Technologies, Inc., Seattle, WA (US)

(72) Inventors: Lichao Wang, Redmond, WA (US); Dmitry Vladimir Zhiyanov, Redmond, WA (US); Archiman Dutta, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1198 days.

(21) Appl. No.: 17/084,356

(22) Filed: Oct. 29, 2020

(51) Int. Cl.
 *G06N 20/00* (2019.01)

(52) U.S. Cl.
 CPC .................................... *G06N 20/00* (2019.01)

(58) Field of Classification Search
 None
 See application file for complete search history.

(56) References Cited

U.S. PATENT DOCUMENTS

| | | | |
|---|---|---|---|
| 8,977,622 B1 | 3/2015 | Dutta | |
| 9,830,344 B2 | 11/2017 | Dutta | |
| 10,217,080 B1 | 2/2019 | Dutta | |
| 10,339,470 B1 | 7/2019 | Dutta et al. | |
| 10,565,385 B1 | 2/2020 | Ravi et al. | |
| 10,726,060 B1 | 7/2020 | Dutta et al. | |
| 10,783,167 B1 | 9/2020 | Dutta et al. | |
| 11,200,511 B1 * | 12/2021 | London | G06N 7/01 |
| 11,640,447 B1 * | 5/2023 | Stone | G06F 18/24 |
| | | | 706/62 |
| 2002/0072828 A1 * | 6/2002 | Turner | G05B 17/02 |
| | | | 700/32 |
| 2009/0091802 A1 * | 4/2009 | Brown | G06V 10/443 |
| | | | 358/466 |
| 2015/0032783 A1 * | 1/2015 | Sareen | G06F 16/284 |
| | | | 707/810 |
| 2016/0162802 A1 * | 6/2016 | Chickering | G06N 20/00 |
| | | | 706/12 |

(Continued)

FOREIGN PATENT DOCUMENTS

| | | | | |
|---|---|---|---|---|
| CN | 111797990 A | * | 10/2020 | G06N 20/00 |

OTHER PUBLICATIONS

Neural-network-based metamodeling for financial time series forecasting Lai et. al. https://scholars.cityu.edu.hk/en/publications/neuralnetworkbased-metamodeling-for-financial-time-series-forecasting(330e6fbb-28f1-44cf-a92b-5216fd2db88c).html (Year: 2006).*

(Continued)

*Primary Examiner* — Mandrita Brahmachari
(74) *Attorney, Agent, or Firm* — Robert C. Kowert; Kowert, Hood, Munyon, Rankin & Goetzel, P.C.

(57) ABSTRACT

Result quality metrics of a set of machine learning tasks conducted on various record groups using a plurality of machine learning models are obtained. Based on applying an algorithm to the record groups, respective sets of intermediary results corresponding to records of the groups are obtained. A meta-model for predicting result quality metrics for respective record-group-and-model combinations is trained using a training data set which includes statistical features obtained from the intermediary results. The trained meta-model is stored.

20 Claims, 11 Drawing Sheets

(56)                References Cited

U.S. PATENT DOCUMENTS

| 2017/0364831 A1* | 12/2017 | Ghosh | G06F 40/40 |
| 2017/0372000 A1* | 12/2017 | Ethington | G06Q 10/20 |
| 2018/0074797 A1* | 3/2018 | Ludwig | G06F 16/00 |
| 2019/0095756 A1* | 3/2019 | Agrawal | G06N 3/08 |
| 2019/0147298 A1* | 5/2019 | Rabinovich | G06N 3/045 |
| | | | 382/157 |
| 2019/0370607 A1* | 12/2019 | Lecue | G06N 20/00 |
| 2021/0312323 A1* | 10/2021 | Arnold | G06F 11/3495 |
| 2022/0015643 A1* | 1/2022 | Rajbhandary | G01K 1/14 |
| 2022/0067520 A1* | 3/2022 | Dalli | G06N 20/00 |

OTHER PUBLICATIONS

A Neural Network Meta-Model and its Application for Manufacturing by Lechebalier et. al. https://tsapps.nist.gov/publication/get_pdf.cfm?pub_id=919287 (Year: 2015).*
Meta-Learning: A Survey Vanchoren et. al. (Year: 2018).*
U.S. Appl. No. 16/808,162, filed Mar. 3, 2020, Xianshun Chen, et al.
U.S. Appl. No. 16/455,601, filed Jun. 27, 2019, Lichao Wang, et al.
U.S. Appl. No. 16/817,218, filed Mar. 12, 2020, Dmitry Vladimir Zhiyanov, et al.
U.S. Appl. No. 16/824,480, filed Mar. 19, 2020, Xianshun Chen et al.
U.S. Appl. No. 16/900,620, filed Jun. 12, 2020, Xianshun Chen et al.
U.S. Appl. No. 16/945,572, filed Jul. 31, 2020, Xianshun Chen et al.
Aaron Klein, et al., "Learning Curve Prediction With Bayesian Neural Networks", Published as a conference paper at ICLR 2017, p. 1-16.
Joaquin Vanschoren, "Meta-Learning: A Survey", arXiv:1810.03548v1, Oct. 8, 2018, pp. 1-29.
Patricia Maforte dos Santos, et al., "Selection of Time Series Forecasting Models based on Performance Information", In Proceedings of the Fourth International Conference on Hybrid Intelligent Systems (HIS'04), IEEE Computer Society, 2004, pp. 1-6.
Jan N. van Rijn, et al., "The online performance estimation framework: heterogeneous ensemble learning for data streams", Machine Learning, 107, 2018, Springer, pp. 149-176.
Amina Adadi, et al., "Peeking Inside the Black-Box: A Survey on Explainable Artificial Intelligence (XAI)", IEEE Access, vol. 6, 2018 , pp. 52138-52160.
Sylvain Arlot, et al., "A survey of cross-validation procedures for model selection", hal-00407906, version 1, Jul. 27, 2009, Published in Statistics Surveys 4 (2010), pp. 1-40.
Rengian Luo, et al., "Neural Architecture Optimization", 32nd Conference on Neural Information Processing Systems (NeurIPS 2018), Montreal, Canada, pp. 1-12.
Bowen Baker, et al., Accelerating Neural Architecture Search Using Performance Prediction, arXiv:1705.10823v2, Nov. 8, 2017, pp. 1-14.

* cited by examiner

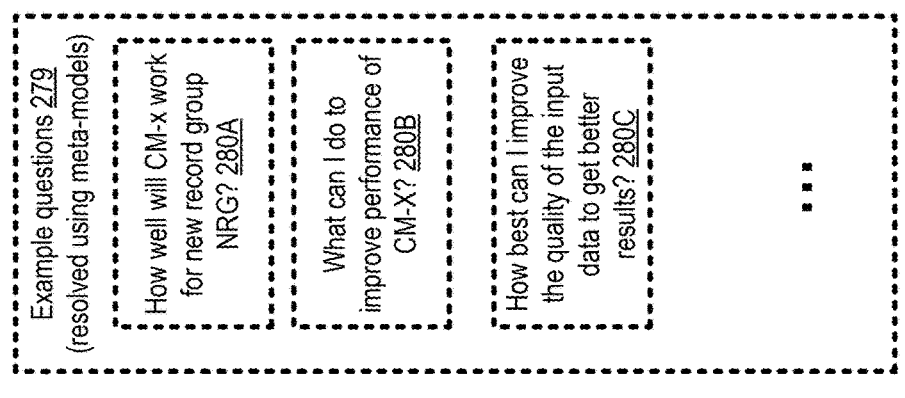

Example questions 279
(resolved using meta-models)

How well will CM-x work
for new record group
NRG? 280A

What can I do to
improve performance of
CM-X? 280B

How best can I improve
the quality of the input
data to get better
results? 280C

. . .

Prediction quality results
220

PQR (206A-212A)

PQR (206A-212B)

PQR (206A-212C)

PQR (206B-212A)

PQR (206B-212B)

PQR (206C-212A)

PQR (206C-212B)

PQR (206D-212B)

. . .

Candidate ML models 210
for solving a particular type
of problem

Candidate model (CM)
212A

CM 212B

CM 212C

. . .

Input data set 204

Record group (RG)
206A

Figure 6:
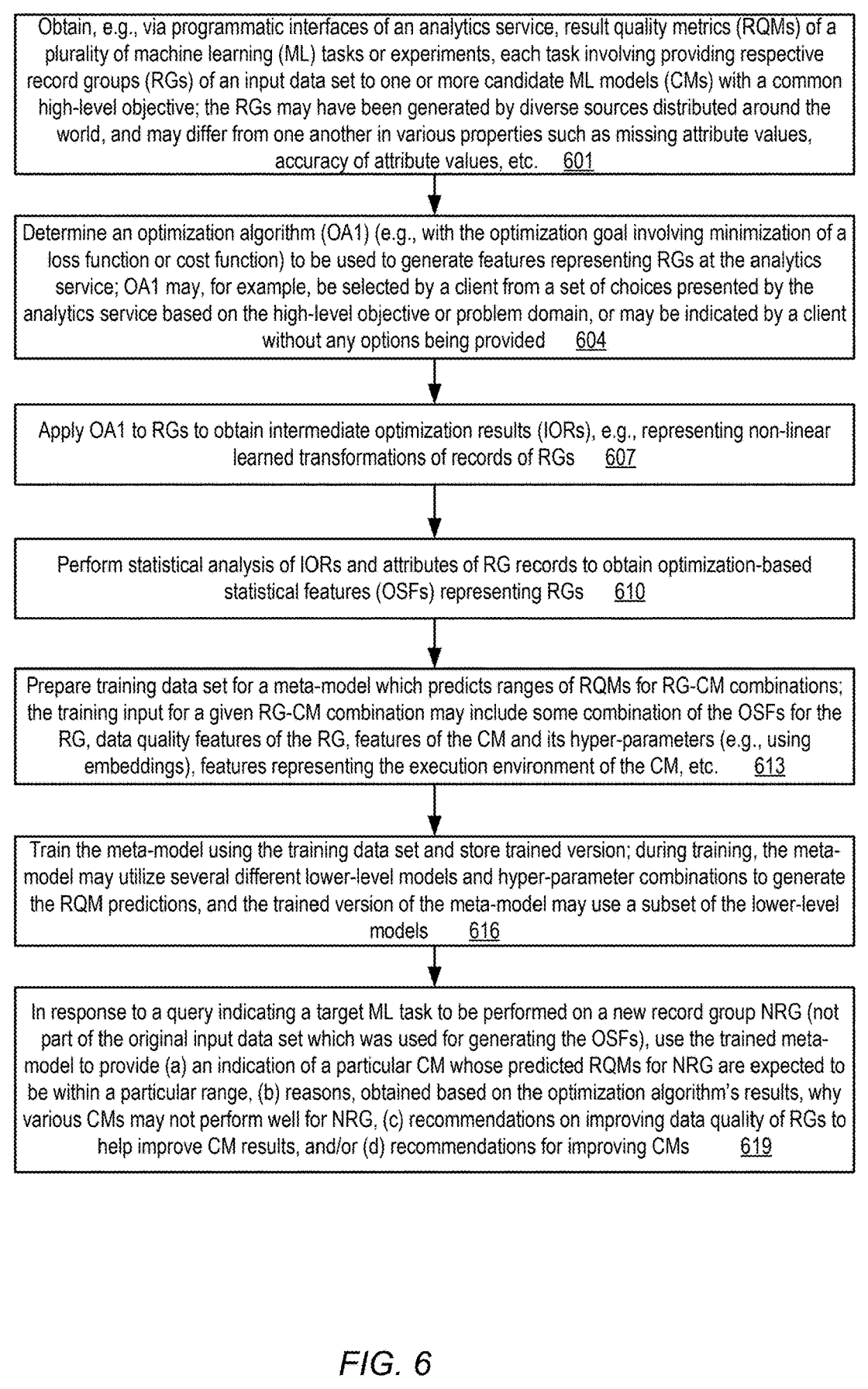

Obtain, e.g., via programmatic interfaces of an analytics service, result quality metrics (RQMs) of a plurality of machine learning (ML) tasks or experiments, each task involving providing respective record groups (RGs) of an input data set to one or more candidate ML models (CMs) with a common high-level objective; the RGs may have been generated by diverse sources distributed around the world, and may differ from one another in various properties such as missing attribute values, accuracy of attribute values, etc.   601

Determine an optimization algorithm (OA1) (e.g., with the optimization goal involving minimization of a loss function or cost function) to be used to generate features representing RGs at the analytics service; OA1 may, for example, be selected by a client from a set of choices presented by the analytics service based on the high-level objective or problem domain, or may be indicated by a client without any options being provided   604

Apply OA1 to RGs to obtain intermediate optimization results (IORs), e.g., representing non-linear learned transformations of records of RGs   607

Perform statistical analysis of IORs and attributes of RG records to obtain optimization-based statistical features (OSFs) representing RGs   610

Prepare training data set for a meta-model which predicts ranges of RQMs for RG-CM combinations; the training input for a given RG-CM combination may include some combination of the OSFs for the RG, data quality features of the RG, features of the CM and its hyper-parameters (e.g., using embeddings), features representing the execution environment of the CM, etc.   613

Train the meta-model using the training data set and store trained version; during training, the meta-model may utilize several different lower-level models and hyper-parameter combinations to generate the RQM predictions, and the trained version of the meta-model may use a subset of the lower-level models   616

In response to a query indicating a target ML task to be performed on a new record group NRG (not part of the original input data set which was used for generating the OSFs), use the trained meta-model to provide (a) an indication of a particular CM whose predicted RQMs for NRG are expected to be within a particular range, (b) reasons, obtained based on the optimization algorithm's results, why various CMs may not perform well for NRG, (c) recommendations on improving data quality of RGs to help improve CM results, and/or (d) recommendations for improving CMs   619

*FIG. 6* https://<website>/trainMetaModel

Please provide your ML task input data below. You can use the "Start meta-model training" button to initiate training of a meta-model which can be used to select the appropriate candidate models from among the candidate models indicated in the task input data. You can choose from among recommended/   877 default options for various fields, or enter custom values.

Drop-down menu icon 878

| High-level task objective 803 | Record-pair match detection 804 |
|---|---|

| Input data set 805 | <StorageServiceURL>/<ObjectContainerName> 807 |
|---|---|

| Optimization algorithm 812 | Token-match algorithm 814 (click to see details) ▼ |
|---|---|

| Meta-model type 818 | Allow service to choose 820 ▼ |
|---|---|

| Meta-model hyper-parameter settings 824 | Allow service to choose 826 |
|---|---|

| Meta-model training constraints 830 | Train within 7 days 832 ▼ |
|---|---|

. . .

Save 866

Start meta-model training 868

Training status 869: In-progress

Run trained meta-model 873

Web-based interface 802

*FIG. 8*

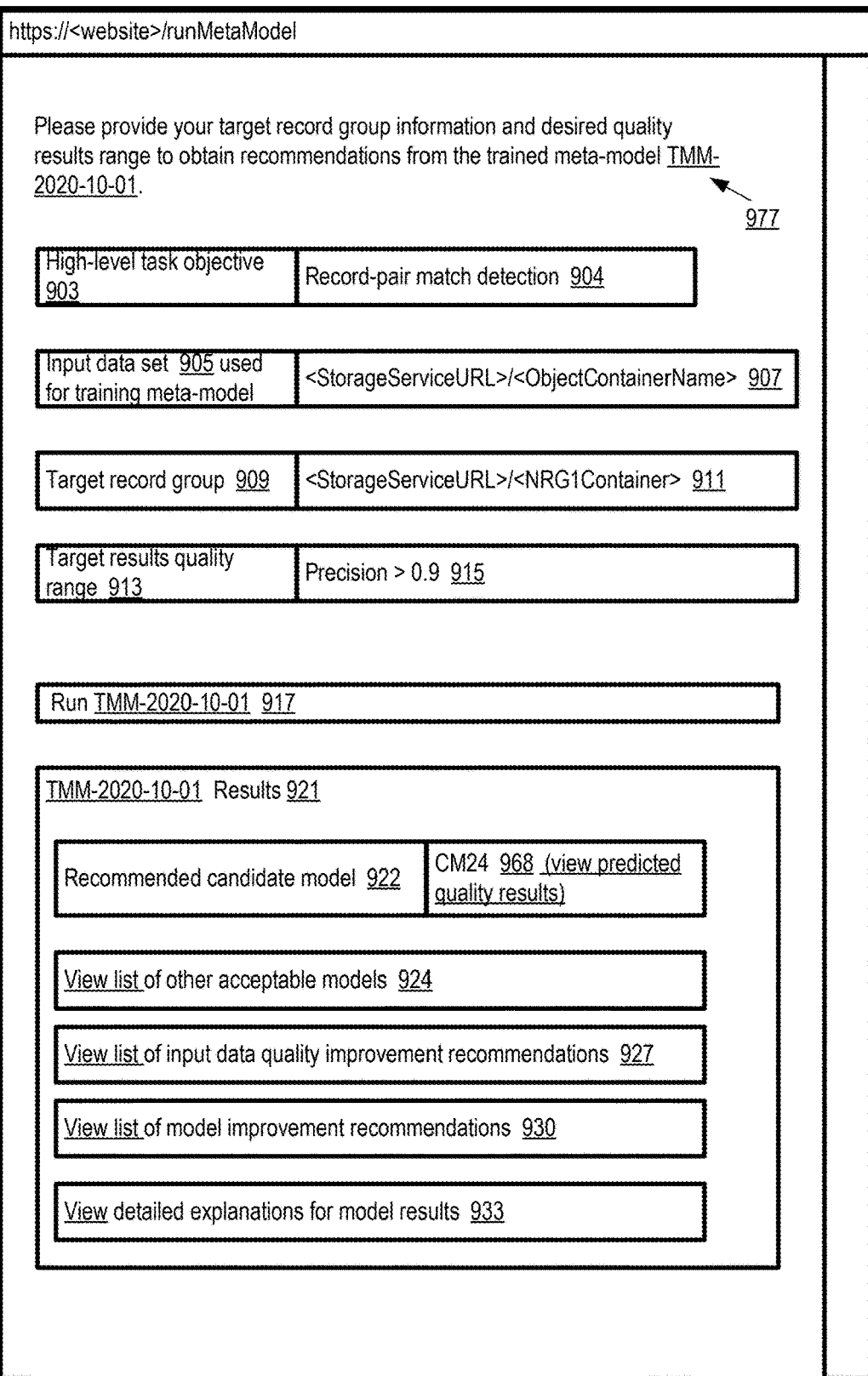

https://<website>/runMetaModel

Please provide your target record group information and desired quality results range to obtain recommendations from the trained meta-model TMM-2020-10-01.

977

| High-level task objective 903 | Record-pair match detection 904 |

| Input data set 905 used for training meta-model | <StorageServiceURL>/<ObjectContainerName> 907 |

| Target record group 909 | <StorageServiceURL>/<NRG1Container> 911 |

| Target results quality range 913 | Precision > 0.9 915 |

Run TMM-2020-10-01 917

TMM-2020-10-01 Results 921

| Recommended candidate model 922 | CM24 968 (view predicted quality results) |

View list of other acceptable models 924

View list of input data quality improvement recommendations 927

View list of model improvement recommendations 930

View detailed explanations for model results 933

Web-based interface 902

*FIG. 9*

META-MODELS FOR PREDICTING MACHINE LEARNING MODEL PERFORMANCE USING FEATURES OBTAINED VIA OPTIMIZATION

BACKGROUND

Many complex applications employ machine learning algorithms and models. Often, to solve a particular problem at a large organization, data may be collected from a wide variety of sources and processed using machine learning techniques. Depending on the problem being solved, in some cases each record of the data which has to be processed may comprise values of a large number (e.g., hundreds or even thousands) of attributes. Furthermore, not all the sources of the data may necessarily provide data adhering to identical standards—e.g., some records provided by a given data source may have missing values for a few attributes, others may contain records in which values of some attributes are misplaced (e.g., the value of a "size" attribute of an item may be entered as part of the "title" attribute), and so on.

As a result of the heterogeneity and high dimensionality of the data, it may sometimes be the case that a single machine learning model may not suffice for processing all the input data of a given application. For the same high-level application objective, one model may perform better (e.g., produce prediction results of higher quality) than a second model on one subset of the input data, while the second model may perform better on another subset. As a result, a collection of machine learning models directed to the same objective, but differing from one another in model details and hyper-parameters, may be trained. When machine learning based predictions have to be obtained for a new set of input records, determining which of the models to use to obtain the best results may represent a non-trivial technical challenge.

BRIEF DESCRIPTION OF DRAWINGS

FIG. 2 illustrates examples of the types of questions which may be answered with the help of meta-models, according to at least some embodiments.

FIG. 6 is a flow diagram illustrating aspects of operations that may be performed to generate and utilize meta-models for predicting the quality of results of machine learning models on different input record groups, according to at least some embodiments.

FIG. 8 and FIG. 9 illustrates example graphical user interfaces which may be used to train and execute meta-models, according to at least some embodiments.

Figure 1:
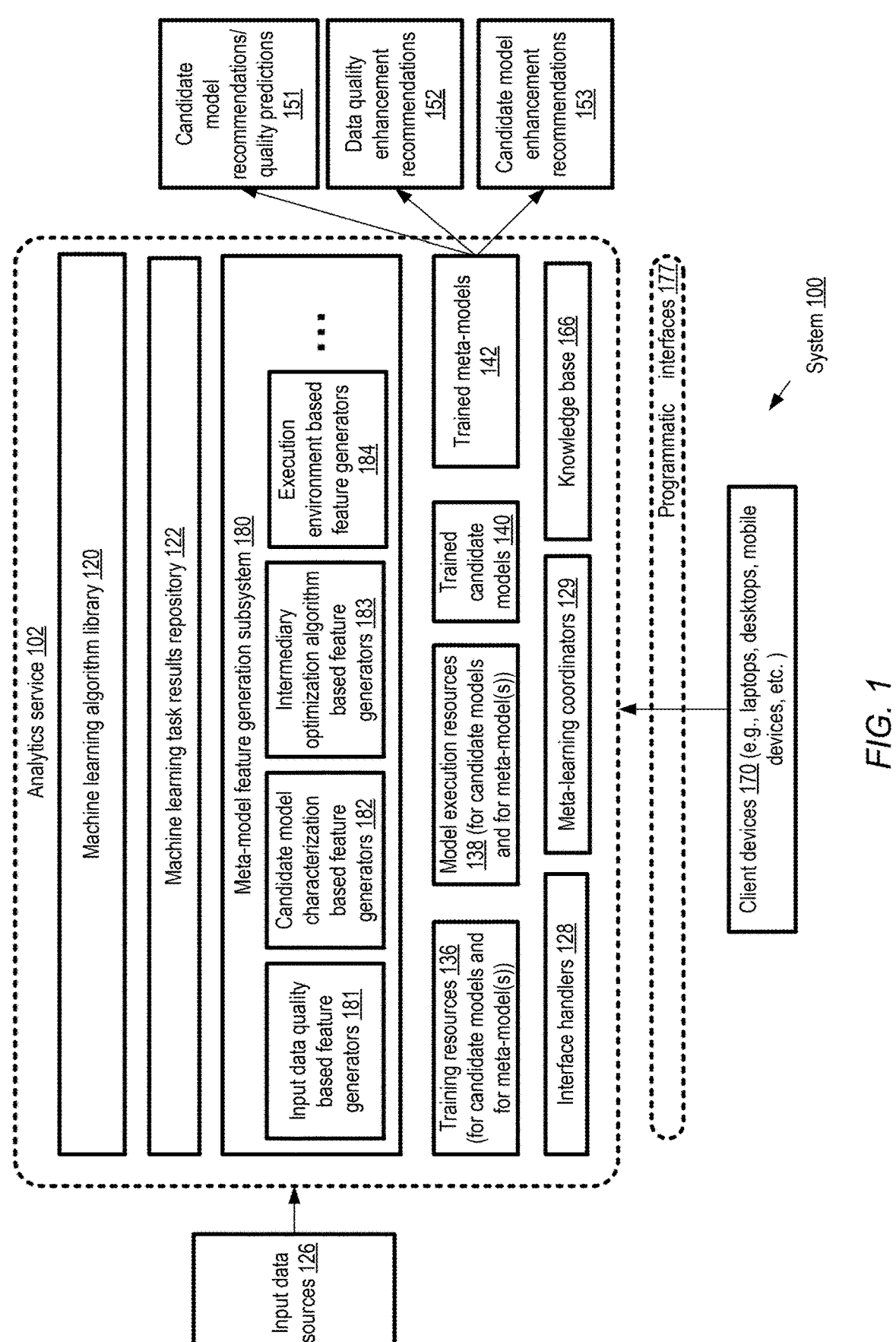
FIG. 1 illustrates an example system environment in which meta-models which utilize features obtained via optimization techniques may be developed to predict the quality of results produced by candidate machine learning models on various groups of input records, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for preparing and utilizing meta-models to facilitate selection, from among a group of candidate machine learning models available for a machine learning problem, of the particular machine learning model or models which are likely to provide desired levels of results quality a given set of input data. A meta-model may in some cases itself comprise one or more machine learning models which are trained to generate predictions about the expected performance of the candidate models on respective groups of input data records. To train the meta-models, a number of different kinds of features (which may be termed "meta-features" as they are utilized by the meta-models) may be generated using a data corpus collected from a plurality of machine learning tasks or experiments which have been conducted using the candidate models on various groups of input records. Such meta-features may include, for example, (a) statistical features obtained from analysis of results of an optimization algorithm applied to the groups of input records represents in the pre-existing data corpus, (b) features indicative of data quality of the groups of input records, (c) features representing characteristics of individual candidate machine learning models, and/or (d) result quality metrics of the tasks.

Using such a rich combination of meta-features, a meta-model which can predict ranges of result quality metrics for any given combination of (candidate model, new input record group) may be trained. When a new machine learning task is to be conducted to solve the machine learning problem with respect to a new set of input records, the trained meta-model may be executed to quickly indicate a recommended candidate model which can provide results within a desired quality range. As a result, experimentation with non-optimal candidate models may not be required for the new set of input records, which can save large amounts of computing, memory and storage resources when large numbers of candidate models are available. In addition, the meta-model may also be usable to help provide intuitive explanations (expressed for example in terms of ranges of attribute values) about why particular candidate models tend to work better with some kinds of input records than others, as well as recommendations for improving input data quality and improving candidate models or tuning candidate models.

Any of a variety of types of optimization algorithms may be employed to generate some of the input features for the meta-models in different embodiments. An objective of the optimization may be expressed as minimization of a loss function or a cost function associated with some computations or transformations performed on the raw input records. A given optimization algorithm, when applied to a set of input records, may generate respective results per input record; such a result for a given input record may in effect represent an additional or auxiliary attribute which characterizes the original input record in a somewhat different way than the original attributes. The results obtained by applying the optimization algorithm to the input records may be referred to as intermediary results. In effect, the optimization algorithm may transform the original data into a new space in an automated rather than a hand-crafted manner, such that richer meta-information representing insights about the input data can be obtained by statistical analysis of the optimization results combined with the original data.

In one example scenario, the candidate models may use deep neural networks with sophisticated multi-layer components to solve a particular problem such as determining whether a pair of records represent the same real-world entity, and an optimization algorithm used for generating meta-features may comprise using a simpler alternative (e.g., a heuristics-based algorithm or a simple decision-tree based algorithm using straightforward matching of text tokens of the record pairs) or substitute technique which also attempts to solve the same problem. Analysis of the results obtained from the simpler alternative, along with the attributes of the corresponding input records, may be used to compute statistical features for the meta-model. In another example scenario, a multi-phase or multi-stage optimization algorithm may be used, in which results from a first auxiliary model of a first stage of the optimization are used as labels of a training data set for a second auxiliary machine learning model of the second stage, and the results of the trained second auxiliary model are used to generate the statistical features for a meta-model.

As one skilled in the art will appreciate in light of this disclosure, certain embodiments may be capable of achieving various advantages, including some or all of the following: (a) substantially reducing the computing, memory, storage, networking and other resources utilized to identify machine learning models which can provide desired levels of result quality for particular groups of input records, (b) eliminating the need for manual generation of intermediary features for meta-models that can predict machine learning model performance, and/or (c) improving the user experience of machine learning model users and application administrators, e.g., by providing easy-to-understand data-driven explanations of why some models work better than others for some types of input data, recommendations for steps that can be taken to improve input data quality and machine learning models, and so on.

According to some embodiments, a system may comprise one or more computing devices, e.g., of an analytics service of a provider network or cloud computing environment. The computing devices may include instructions that upon execution on or across the one or more computing devices cause the one or more computing devices to obtain respective result quality metrics of a plurality of machine learning tasks. A given task may include providing respective record groups of a plurality of record groups as input to one or more candidate machine learning models of a plurality of candidate machine learning models which have been developed or identified for solving a particular problem. Each of the record groups may comprise one or more records, and each record may include values of one or more attributes of various data types, such as text, images, videos, audio and the like in at least some embodiments.

An optimization algorithm to be used to generate one or more features representing individual record groups may be determined in various embodiments. An objective or goal of the algorithm may be expressed via a loss function or cost function (e.g., a function specified by a client of an analytics service, or a function selected by an analytics service). In some cases, for example, a client of an analytics service may provide an indication of a high-level optimization objective to be used for meta-feature generation, and the analytics service may identify an algorithm which can be used to achieve the objective. In other cases, the client may provide the algorithm, or select the optimization algorithm from a set of proposed optimization algorithms indicated by the analytics service. In at least some embodiments, the analytics service may choose an optimization algorithm, e.g., based on the problem domain being addressed by the candidate machine learning models, based on properties of the candidate machine learning model, based on knowledge base entries indicating the kinds of optimization techniques which have been successfully employed for meta-feature generation in the past, and/or based on other factors.

Based at least in part on applying the optimization algorithm to the records of the record groups, respective sets of optimization results (also referred to as intermediary results) corresponding to individual record groups may be obtained. In at least some embodiments, a set of optimization results for a record group may comprise non-linear learned transformations of the records of the record group. For example, such non-linear learned transformations may be obtained by using an alternative (typically simpler or cruder) machine learning model that attempts to solve a similar problem to that solved by the candidate machine learning models, with a particular loss function that is minimized as part of the optimization. In other embodiments, the optimization results may not necessarily be learned via machine learning. In one embodiment, at least a subset of the optimization results may be comprise linear transformations of portions of the records.

Using statistical analysis of the set of optimization results in combination with contents of the records of a given record group, one or more statistical features representing that record group may be generated in various embodiments. A training data set for a meta-model for predicting respective result quality metrics ranges associated with respective record-group-and-candidate-model combinations may be prepared in at least some embodiments. The training data set may include, with respect to a combination of a particular record group and a particular candidate machine learning model, at least (a) one or more data quality features or data properties of the particular record group and (b) the one or more statistical features obtained via optimization. The meta-model may be trained using the training data set, and the trained version of the meta-model may be stored, e.g., at a repository of an analytics service.

The trained meta-model may be utilized in several different ways in various embodiments. For example, in one embodiment, a query indicating a target machine learning task to be performed on a record group (which was not part of the data used to generate the features of the meta-model) may be received, e.g., at an analytics service at which the meta-model is trained and stored, and the trained meta-model may be used to provide an indication of a particular candidate machine learning model of the plurality of candidate machine learning models whose predicted result quality metrics with respect to the target machine learning task are within a particular range. A ranked list of candidate models, arranged in order of expected prediction results quality for the new record group, may be provided using the meta-model in some embodiments. In another embodiment, instead of or in addition to indicating a preferred or recommended candidate machine learning model, explanations for why the preferred candidate is likely to perform better than other candidate models may also be provided.

In some embodiments, as mentioned above, applying the optimization algorithm may comprise executing an auxiliary machine learning model which is not one or the candidate models. In one embodiment, the optimization algorithm may comprise several stages. In a first stage of the optimization algorithm, a first auxiliary machine learning model may be used to obtain respective results corresponding to various records of the record groups for which prediction quality results have been obtained for the candidate models, with a first loss function being minimized or optimized. Then, the results of the first auxiliary model may be used to generate a training data set for a second auxiliary machine learning model, which also provides predictions with respect to the records of the record groups. The second auxiliary model may be trained using the training data set, and the results from the second auxiliary model may be used (along with, for example, the contents of the corresponding input records of the record groups) to generate statistical features for the meta-model.

According to one embodiment, metadata pertaining to the machine learning tasks whose results have been obtained may be provided via programmatic interfaces to an analytics service, e.g., by a client on whose behalf the meta-model is to be prepared and used. The metadata may include, for example, an objective of some or all of the tasks, such as identifying duplicate records within a data set, identifying objects within images, and so on. Based at least partly on the metadata, the analytics service may identify one or more candidate optimization algorithms (e.g., algorithms that attempt to achieve the same kinds of objectives using a different methodology than the candidate models) for meta-feature generation, and provide an indication of the candidate optimization algorithms to the client. The client may then select one (or more) of the candidate optimization algorithms, and programmatically request that the selected optimization algorithm(s) be used for generating features for the meta-model.

Any of a variety of automated statistical techniques or algorithms may be used to generate meta-feature values from the optimization results in different embodiments. For example, metrics of correlations between the optimization results and various attribute values (or attribute value ranges) of the records for which the optimization results are obtained may be automatically computed in some embodiments. In one embodiment, an analytics service may include a suite of automated statistical tools which are applied to the optimization results and the input of the optimization algorithm, and the results of some or all of the automated statistical tools may be used as meta-features. In some embodiments, the statistical features may be obtained at least in part using internal intermediary values computed during the optimization procedure (e.g., weights learned in a hidden layer of an auxiliary machine learning model used for the optimization).

In some embodiments, the input feature set for the meta-model for a given record-group-and-candidate-model combination may include an encoding (e.g., an embedding vector representation) of the candidate model itself. In one embodiment, the input feature set for the meta-model for a given record-group-and-candidate-model combination may include an encoding representing an execution environment of the candidate model. In at least one embodiment in which the meta-model is prepared at an analytics service, the service may provide a set of easy-to-use interfaces (e.g., web-based or graphical interfaces with drop-down menu options and pre-selected default values for some metadata attributes) which guide a client through the process of providing various kinds of metadata which can then be used by the analytics service to generate the meta-features. In at least some embodiments, additional machine learning models may be used at an analytics service to help identify/select the optimization algorithms to be used to obtain the meta-features.

According to some embodiments, recommendations for improving the data quality of record groups provided as input to the candidate models (and/or the meta-model itself) may be provided by an analytics service, e.g., based at least in part on statistical analysis of the results obtained from the meta-model. For example, analysis of the results of the meta-model may indicate that, regardless of the kind of candidate machine learning model used, the results for record groups that have inaccurate or incomplete values of some combination of attributes are poor. As such, the recommendation or improving the data quality may comprise suggestions to ensure that more accurate and complete values be obtained for the identified combination of attributes. In various embodiments, recommendations for changes (e.g., hyper-parameter changes) which could lead to improving the quality of results of the candidate models may be provided by an analytics service after an analysis of the relative performance of the candidates models and the hyper-parameter used for the tasks. In one embodiment, for example, analysis of the meta-model results may indicate that neural network-based models with a first range of convolution filter sizes (or a certain number of hidden layers) tend to perform better for some types of common record group attribute value distributions than others, so recommendations for candidate model changes may include modifying convolution filter sizes or the number of hidden layers. In some embodiments, the meta-model may be used to generate predictions of respective predicted result quality for several different tuning parameter settings of a given candidate model at an analytics service, and analysis of the predicted result quality as a function of the tuning parameter settings may be performed automatically at the analytics service. Based on such an analysis, the service may provide recommendations for further tuning of the model—e.g., if increasing the value of a particular tuning parameter resulted in better quality, the service may automatically recommend a further increase of the particular tuning parameter, while if increasing the value of the particular tuning parameter resulted in worse quality, the service may automatically recommend reducing the value of the particular parameter.

According to some embodiments, as suggested earlier, meta-models of the kind introduced above may be trained and/or executed at a network-accessible analytics service of a provider network, e.g., in response to one or more programmatic requests directed to the analytics service by its clients. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

Example System Environment

FIG. 1 illustrates an example system environment in which meta-models which utilize features obtained via optimization techniques may be developed to predict the quality of results produced by candidate machine learning models on various groups of input records, according to at least some embodiments. As shown, system 100 comprises resources and artifacts of an analytics service 102, including a machine learning algorithm library 120, a machine learning task results repository 122, a meta-model feature generation subsystem 180, training resources 136, model execution resources 138, trained candidate models 140, trained meta-models 142, interface handlers 128, meta-learning coordinators 129 and a knowledge base 166.

The analytics service 102 may implement a set of programmatic interfaces 177 in the depicted embodiment, such as one or more web-based consoles, command-line tools, application programming interfaces (APIs), graphical user interfaces and the like. Such interfaces may be utilized by clients of the analytics service to submit various types of messages or requests pertaining to the preparation and use of meta-models, candidate machine learning models and the like, and receive corresponding responses from the analytics service. Requests or messages may be transmitted, for example, from a variety of client devices 170 in different embodiments, such as desktops, laptops, mobile devices and the like. The requests may be received by interface handlers 128 implemented using one or more computing devices in the depicted embodiment. The interface handlers 128 may then transmit internal versions of the requests/messages to other subcomponents of the analytics service 102, receive responses from the other subcomponents and pass them on to the clients via the programmatic interfaces 177.

In the embodiment depicted in FIG. 1, analytics service 102 may be utilized to train and execute several types of machine learning models. One such type may include candidate models 140, which have been developed for solving problems (such as data deduplication, record similarity detection, image analysis, and so on) for various applications which require the processing of large numbers of high-dimensional records from a variety of input data sources. Several candidate models, which may differ from one another in terms of their model type (such as deep neural network vs. random forest), hyper-parameter values, feature engineering approaches, and the like, may have been developed for analyzing respective subsets of records of a given large input data set accumulated from a variety of input data sources 126 in the depicted embodiment. Multiple candidate models may have been developed, for example, because no single model may be able to provide results of a desired level of quality for the entire diverse data set. Individual ones of the candidate models 140 may work best for respective subsets of the input data for a given application. The subsets of data may differ from each other in their data quality (e.g., how many attribute values are missing on average, how many attribute values are inaccurate/erroneous, how many attribute values are redundant, etc.), and/or the particular kinds of entities represented in the individual; data records (e.g., clothing items sold by one or more stores versus electronic items sold via the same store(s)) so a single model may not work optimally for all the different subsets of the input data set. The candidate models may be trained using training resources 136 comprising one or more computing devices using algorithms from machine learning algorithm library 120, and executed at model execution resources 138 also comprising one or more computing devices in the depicted embodiment. Results of executing the candidate models on various groups of input records may be stored at machine learning task results repository 122 in at least some embodiments.

In addition to the candidate models, resources of the analytics service 102 may also be used to prepare and run meta-models (in some cases also implementing machine learning algorithms from library 120) which can be used to select, for any group of input records, the best candidate models from among the trained candidate models 140 available for a given type of machine learning task or application in the depicted embodiment. Individual meta-models may comprise one or more machine learning models trained (e.g., also using training resources 136) using features derived from existing corpora of results which have already been obtained for various tasks via the candidate models. Several different types of features to be used as input for the meta-models may be generated at the meta-model feature generation subsystem 180 of the analytics service 102 in the depicted embodiment, e.g., by input data quality based feature generators 181, candidate model characterization based feature generators 182, intermediary optimization algorithm based feature generators 183, execution environment based feature generators 184 and the like, each of which may be implemented using one or more computing devices in the depicted embodiment. After the meta-models have been trained, the trained versions of the meta-models 142 may be stored, and executed (e.g., at model execution resources 138) as needed in response to queries requesting recommended candidate models for new groups of input records. In addition to providing candidate model recommendations and/or result quality predictions 151, the trained meta-models may also be used to provide data quality enhancement recommendations 152 and/or candidate model enhancement recommendations 153 in various embodiments.

According to some embodiments, a client of the analytics service 102 may use programmatic interfaces 177 to indicate result quality metrics of some number of related machine learning tasks (e.g., tasks with a common high-level goal or objective) executed using a group of trained candidate models 140. Each task may have involved providing a respective record group of a larger data set obtained from input data sources 126 to one or more of the trained candidate models. The quality metrics used to characterize the tasks may vary from one type of machine learning problem to another—e.g., metrics such as precision, recall, AUC (are under the curve) of a receiver operating characteristic (ROC), sensitivity, etc. may be used for different tasks.

One or more intermediary optimization algorithms to be used to generate at least some features for training a meta-model may be selected, e.g., by meta-learning coordinators 129 implemented at one or more computing devices in the depicted embodiment. The optimization algorithms (and/or their objective functions, loss functions, cost functions, etc.) may be indicated by clients via programmatic interfaces 177 in some embodiments. In other embodiments, based for example on metadata provided by clients regarding the overall objective of the set of tasks for which result quality metrics were obtained, and/or based on entries in knowledge base 166 which indicate the kinds of optimization algorithms which were successfully used to generate features for other meta-models in the past, the meta-learning coordinators 129 may choose the optimization algorithms to be used. In at least one embodiment, the analytics service may first select a set of candidate optimization algorithms based on metadata available on the machine learning tasks, and the allow a client to select a particular optimization algorithm (or more than one optimization algorithm) from the candidates. The optimization algorithm(s) may be referred to as "intermediary" as they are used to prepare features which are in turn used in the process of identifying recommended candidate models; as such, the optimization algorithms are used indirectly rather than directly to find candidate models likely to perform better for a given group of input records.

By applying the optimization algorithm(s) to the record groups, respective sets of optimization results corresponding to records the record groups (for which the result quality records of the candidate models are known) may be produced, e.g., by the meta-learning coordinators 129 in the depicted embodiment. In at least some embodiments, the optimization results may themselves be obtained using one or more auxiliary machine learning models (models which are not among the candidate machine learning models, and models which differ from the meta-models), and as such the optimization results may in some cases comprise non-linear learned transformations of records of the record groups. Using statistical analysis on the results of the optimization, a set of statistical features may be obtained for various record groups, e.g., by intermediary optimization based feature generators 183 in the depicted embodiment.

A training data set of a meta-model for predicting respective result quality metrics ranges associated with respective record-group-and-model combinations may be prepared in the depicted embodiment by the meta-learning coordinators 129. The training data set may comprise, for a given record-group-and-candidate-model combination, the statistical features obtained using optimization, one or more data quality features/properties of the record group (obtained from input data quality based feature generators 181), features representing the candidate model (obtained from candidate model characterization based feature generators 182), features representing the execution environments which were used for the candidate models when the machine learning tasks for which prediction quality results are available were conducted, (obtained from execution environment based feature generators 184), and/or additional types of features in at least some embodiments (such as general statistical features indicating the average length of text-based attributes of the records, average sizes of image attributes, etc.)

Using the training data set, one or more meta-models for predicting result quality (or ranges of expected result quality) for a given group of records and any of the trained candidate models 140 may be trained at training resources 136 in the depicted embodiment. A trained version of the meta-model may be stored. The trained meta-model 142 may be used to respond to queries of various kinds, including for example queries requesting recommended candidate models to be used for a task involving analysis of a new group of records (i.e., records for which results from candidate models are not already available) so as to achieve a desired result quality level or a desired range of result quality.

Example Questions Answered Using Meta-Models

FIG. 2 illustrates examples of the types of questions which may be answered with the help of meta-models, according to at least some embodiments. In the embodiment depicted in FIG. 2, a large input data set 204 for a particular type of problem solved using machine learning (e.g., a classification problem, a regression problem, etc.) comprises a plurality of subsets called record groups (RGs), such as RG 206A, RG 206B, RG 206C and RG 206D. Respective RGs may have been obtained from different data sources, for example, or may have been collected during different time periods, and as a result the records of the input data set may not be homogeneous with respect to quality and completeness. Individual records of the record groups may comprise values for a variety of attributes, including for example attributes comprising unstructured text, images, videos, audio, categorical attributes, and the like.

Because of the heterogeneity of the input data set, a plurality of candidate machine learning (ML) models 210, all directed to solving the same type of problem, may have been developed over time, e.g., using resources of an analytics service similar to analytics service 102 of FIG. 1. For example, candidate model (CM) 212A, CM 212B and CM 212C may have been trained and used to obtain prediction results in various record groups.

Several sets of experiments, each representing a machine learning task involving a given RG 206 and a given CM 212, may be conducted in the depicted embodiment, e.g., in an attempt to obtain prediction quality results of a targeted level for each of the RGs. The prediction quality results (PQRs) for various combinations of RGs 206 and CMs 212 may thus be available, and may be used to generate input features to be used to train meta-models that can be used to predict the quality result ranges that are likely to be obtained if any group of records is provided as input to any CM 212. Note that PQRs 220 may not necessarily be available for all possible combinations of RGs and CMs in at least some embodiments. Thus, for example, while PQRs for the combination (RG 206A-CM 212A), (RG 206A-CM 212B), (RG 206A-CM 212C), (RG 206B-CM 212A), (RG 206B-CM 212B), (RG 206C-CM 212A), (RG 206C-CM 212B), and (RG 206D-CM 212B) are shown in FIG. 2, PQRs for other potential record-group-and-candidate-model combinations such as (RG 206B-CM 212C) may not have been collected.

Examples 279 of the kinds of question which may be answered or resolved with the help of meta-models in the depicted embodiment include "How well will a given CM, CM-X, work for a new record group NRG" 280A, "What can I do to improve performance of a given CM, CM-X" 280B, and "How best can I improve the quality of the input data to get better results?" 280C. Meta-models of the kind introduced above may be able to help respond to these kinds of questions because of the rich feature sets used to train the meta-models, including features obtained from nonlinear transformations of the raw data which capture salient characteristics of the raw data that may not have been easy to extract without the use of optimization algorithms, features obtained from data quality analysis of the RGs, features which characterize the CMs via high-dimensional embeddings, and so on.

Example Input Features for Meta-Models

Figure 3:
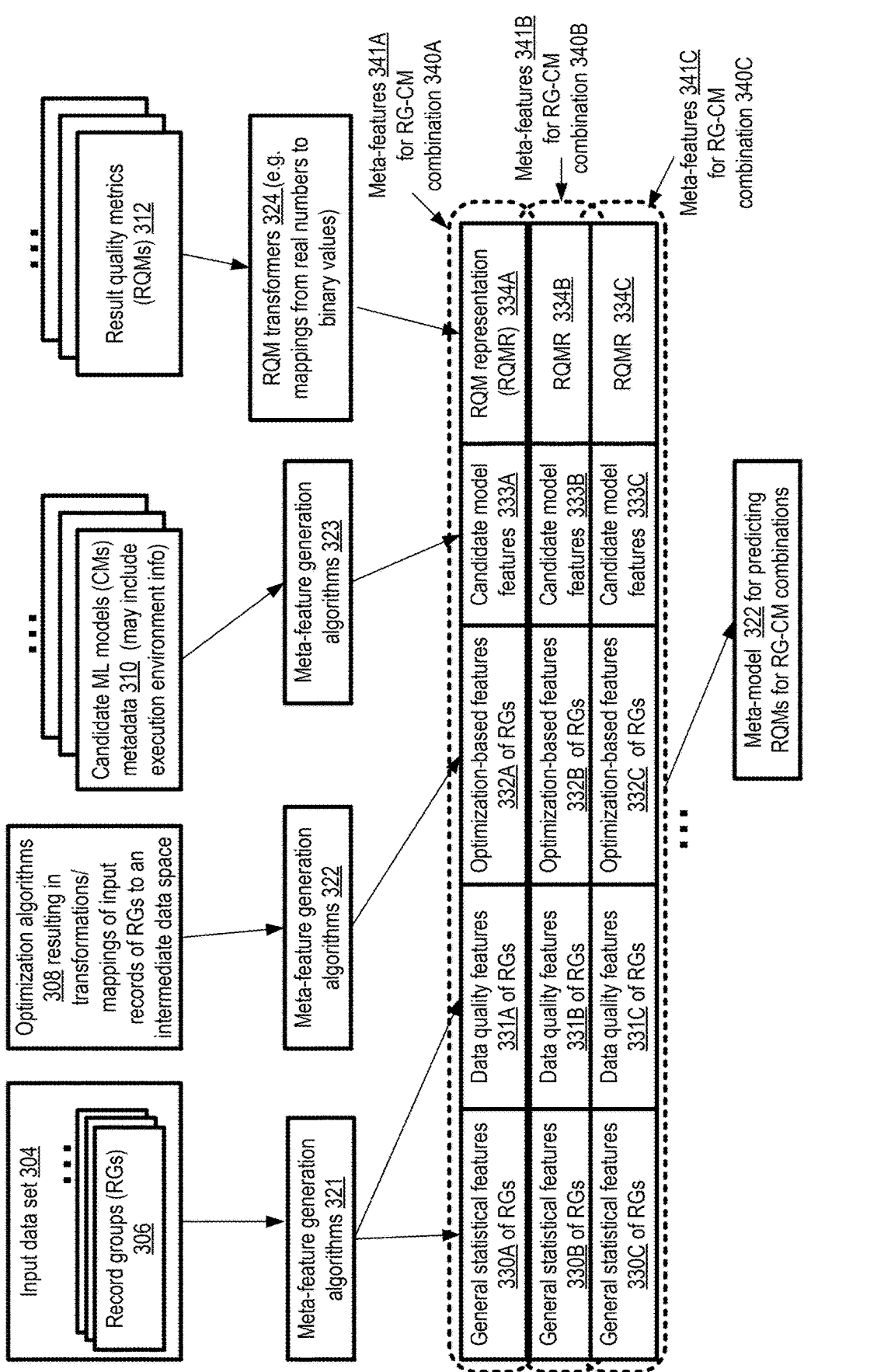
FIG. 3 illustrates example categories of features which may be consumed as input by meta-models for predicting result quality of machine learning models, according to at least some embodiments.

FIG. 3 illustrates example categories of features which may be consumed as input by meta-models for predicting result quality of machine learning models, according to at least some embodiments. In the depicted embodiment, at least two types of features may be extracted using meta-feature generation algorithms 321 from the record groups (RGs) 306 of an input data set 304 for which many candidate models have been developed. These include general statistical features 330 (e.g., 330A, 330B or 330C) of the RGs such as the average lengths (in characters or bytes) of text attributes, the average lengths of tokens in the text the average sizes of images, the number of text attributes, the number of non-text attributes and the like, as well as data quality features 331 (e.g., 331A, 331B or 331C) of the RGs. For machine learning tasks (such as record matching or similarity detection tasks) that involve pairs or groups of records, general statistical features 330 may include, for example, overall record size ratios among the pairs or groups of records, or attribute-level size ratios among the pairs or groups of records in some embodiments.

Data quality features 331 may include, for example, the proportion of attributes with missing or null values, the duplication rate among RGs (proportion of duplicated records), the counts or rates of invalid or outlier attribute values (detected for example via statistical outlier analysis), and so on. In some cases a data quality feature 331 for a given record-group-and-candidate-model combination may be dependent on the particular kind of candidate model used in the combination: for example, some candidate models may rely on the presence of non-null values in a particular attribute, so a data quality feature may indicate the ratio of records in the RG 306 which have non-null values in such attributes.

Optimization algorithms 308 which result in transformations/mappings of input records of the RGs to an intermediate data space may be used to generate optimization-based features 332 (e.g., 332A, 332B or 332C) of the RGs 306 in the depicted embodiment. Meta-feature generation algorithms 322, which may perform statistical analysis on results obtained from the optimization algorithms, may be used to obtain the values of the optimization-based features 332 in the depicted embodiment.

Metadata 310 about the candidate ML models, such as the type of algorithm used, the hyper-parameter values used, and so on, may be transformed via meta-feature generation algorithms 323 into candidate model features 333 (e.g., 333A, 333B or 333C) in at least some embodiments. Meta-feature generation algorithms 323 may for example, produce respective learned embedding vectors representing each of the candidate ML models. In at least some embodiments, information about the execution environment (e.g., the types of physical and/or virtual computing devices used, the memory used, etc.) of the candidate ML models may be included in the metadata 310 and incorporated into candidate model features 333. In other embodiments, the execution environments may be represented by a separate set of meta-features than the candidate ML models.

Result quality metrics (RQMs) 312 for machine learning tasks involving the candidate ML models and the RGs 306 may also be included in the meta-features in the depicted embodiment. For example, RQM transformers 324 may generate, from the RQMS 312, transformed RQM representations (RQMRs) such as RQMR 334A, 334B and 334C for RG-CM combinations 340A, 340B and 340C respectively. In one embodiment, real number RQM values may be mapped to binary values, with a "1" indicating an acceptable range of RQM values, and a "0" indicating an unacceptable range of RQM values. The RQMRs 334 may in effect serve as labels for supervised meta-model training in the depicted embodiment. Respective sets of meta-features may be generated for various combinations of RGs and CMs such as RG-CM the depicted embodiment, and provided as input to a meta-model 322 for predicting RQMs or RQM ranges for different RG-CM combinations (including combinations involving RGs which are not part of the input data set 304). For example, meta-features 341A, 341B and 341C may be generated for RG-CM combinations 340A, 340B and 340C respectively. In effect, the meta-features for a given RG-CM combination may capture salient characteristics of the input data and the candidate ML models which can be used to predict how well any of the CMs is likely to perform on any given input data.

Example Optimization Algorithms

Figure 4:
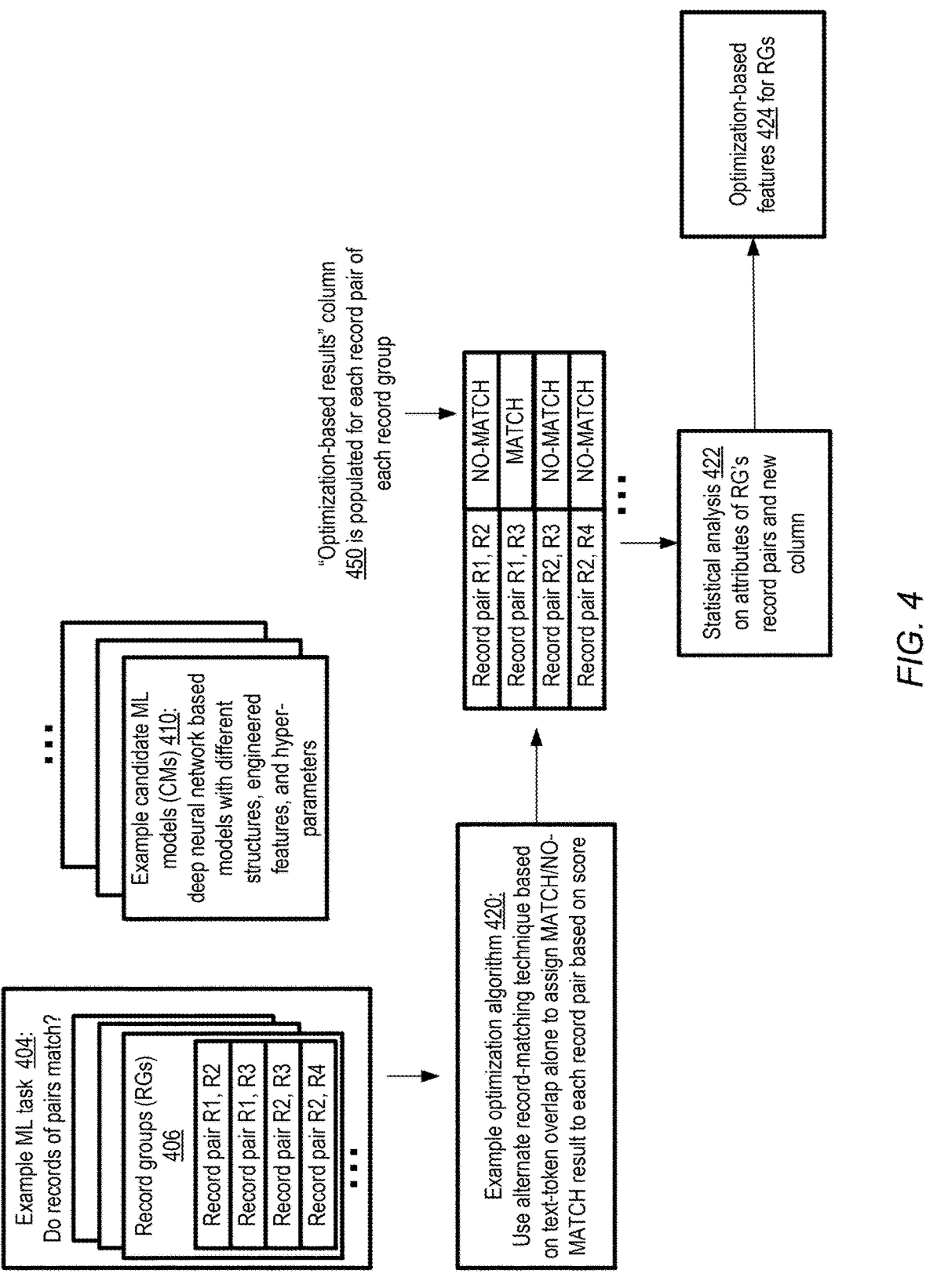
FIG. 4 and FIG. 5 illustrate examples of the use of optimization algorithms of differing levels of complexity for generating meta-model features, according to at least some embodiments.
Figure 5:
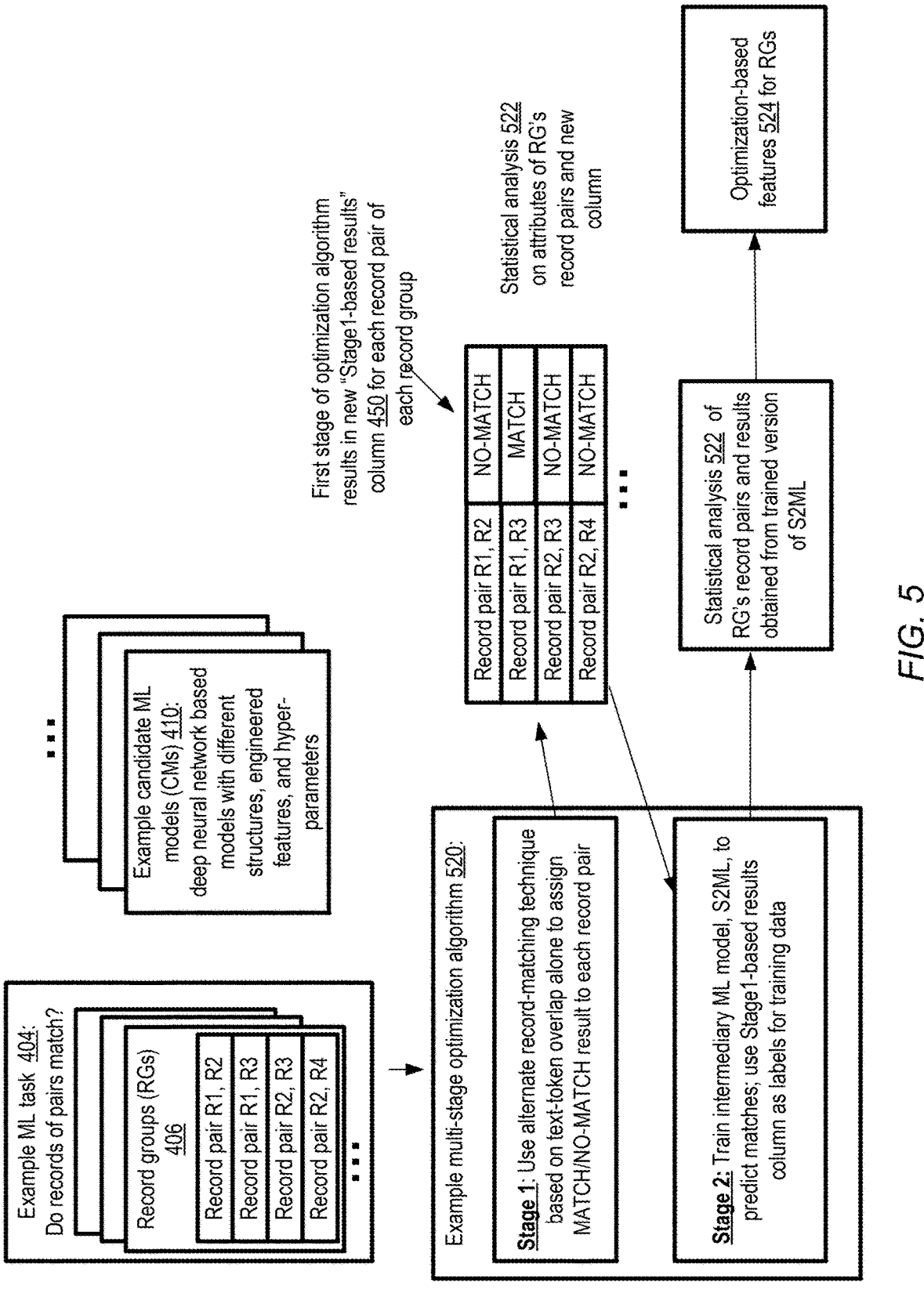

FIG. 4 and FIG. 5 illustrate examples of the use of optimization algorithms of differing levels of complexity for generating meta-model features, according to at least some embodiments. In FIG. 4 and FIG. 5, the problem to be solved in example machine learning (ML) task is to determine whether the records of various record pairs match (i.e., whether the two records of a given record pair represent the same real-world entity). This type of problem may require a solution, for example, for an application which manages the catalog of a store. Numerous item suppliers may wish to sell their items via such a store, and each of the sellers may provide respective records representing/describing each of the items using some combination of text attributes (e.g., item name, description, etc.) and non-text attributes (e.g., images, videos and the like showing the item). It may sometimes be the case that many different sellers (e.g., located in various countries around the world) attempt to sell the same item while providing (at least slightly) differing records describing the item. In order to avoid confusion among potential item consumers, and to maintain the integrity of the catalog, the organization which owns the store may wish to identify matching records. Matching analysis may also be conducted in such a scenario between the records supplied by item sellers and authoritative record descriptors provided by item manufacturers, e.g., to determine the fraction of a manufacturer's product set which is available at the store.

Because of the heterogeneity of the record sources and the corresponding heterogeneity of the records themselves, a single record matching model may not be able to provide results of a sufficient quality for all the record pairs to be analyzed. A number of example candidate ML models (CMs) 410 may be tried out on different subsets of the input data in the depicted embodiment. Such models may include deep neural network based models with different structures, different sets of engineered features, and/or different hyperparameter combinations. Some of the models may include a text analysis sub-model and a non-text analysis sub-model with equal emphasis placed on the text and non-text attributes; others may first use text attributes to determine if the records of a pair match and use non-text attributes in scenarios in which the result of the text-only analysis is not decisive. The quality of the record-matching results produced by a given CM may vary from one subset of the input data set to another.

A number of record-matching tasks or experiments may be conducted in the depicted embodiment in an attempt to find the best CM for respective record groups (RGs) 406. An individual RG may comprise some number of record pairs such as record pair (R1, R2), (R1, R3), (R2, R3), (R2, R4) etc.

An example optimization algorithm 420 may be identified, which takes a simpler alternate approach towards record matching. In the depicted example scenario, records Ri and Rj of a pair may be designated as matching (assigned a MATCH result) if at least K tokens of a particular attribute (such as a "description" attribute) of Ri are also present in the same attribute of Rj, and designated as not matching (assigned a NO-MATCH result) if this condition does not hold. In effect, given some set of labeled record pairs with MATCH and NO-MATCH labels, the optimization objective of the algorithm 420 is to minimize the entropy between the extent of the token overlap and the labels. Note that while the record-matching technique of the example optimization algorithm has the same overall goal as the CMs, it uses a much simpler approach, does not require a lot of training resources or time to execute, and is likely to produce different results than are produced by CMs which use sophisticated neural network-based approaches.

As a result of applying the optimization algorithm, a new "optimization-based results" column 450 is populated for each record pair of each RG in the depicted scenario. This column represents a transformation of the record pairs into a new data space that depends on the available ground-truth labels for the record pairs, the distribution of text token overlaps and the objective function of the alternate record-matching algorithm.

Based on statistical analysis 422 analysis of this new column and the existing attribute values of the record pairs of each RG, optimization features 424 may be generated for each RG and used as part of the meta-features for training the model. A few simple examples of different types of statistical analysis are provided below.

The alternate record-matching algorithm of FIG. 4 may be expressed as a simple if-then statement for any given record pair (record1, record2):

```
if (#of exact-matching tokens of (record1.description) and
    (record2.description))>K
then result (record1,record2)=MATCH
else result (record1, record2)=NO-MATCH;
```

In one simple statistical analysis example, the fraction of record pairs for each RG for which the optimization-based result is MATCH may be computed. If this fraction is high for a given RG, this means that there is a high level of overlap between the records of the RG's record pairs, so a deep neural network based CM (say CM-A) which is known to work well with high overlap record pairs may be better for the RG than another deep neural network based CM (CM-B) which is known to work less well with high overlap record pairs—as such, a numeric meta-feature which indicates that the likelihood of CM-A working well may be generated.

In another type of statistical analysis, the average lengths of other text features such as "item name" etc. for each class (MATCH vs. NO-MATCH) predicted by the token overlap based technique may be computed for each RG, or the fraction of each class which has missing values in a "size" attribute may be computed, and numerical meta-features representing such statistics may be generated.

Using those record pairs for which ground truth labels are available, quality metrics such as precision and recall of the overlap-based technique may be computed, and used as statistical optimization-based features in some embodiments.

By varying the overlap parameter K in the above if statement, different values may be obtained for the optimization-bases results column for a given RG. Results of a statistical analysis of the variation in the optimization-based results as a function of K may be used as meta-features.

In the embodiment depicted in FIG. 5, a multi-stage optimization algorithm is used to generate meta-features for record groups for example ML task 404. In stage 1 of the example multi-stage optimization algorithm, the same alternate record matching technique based on token overlap which was discussed in the context of FIG. 4 may be used to populate values of a "Stage1-based results" column 450 for each record pair of each record group.

In Stage 2 of the algorithm 520, another intermediary ML model S2ML may be trained to predict record matches, using a training data set which includes at least some values of the Stage1-based results column as labels. Then, a trained version of S2ML may be used to predict its own MATCH/NO-MATCH results for record pairs, and a statistical analysis 522 may be performed on the predictions of S2ML and the attributes of the original record pairs to obtain a set of optimization-based features 524 for RGs.

In some embodiments, applying an optimization algorithm to the record groups of a data set of an application may comprise executing a single auxiliary machine learning model (e.g., a simple two-layer neural network instead of the if statement based logic discussed in the context of FIG. 4). In other embodiments, more than one auxiliary ML model may be employed—e.g., a first model may be used in a first stage of the optimization, and another model (trained using the results from the first model as labels) in a second stage. In some embodiments, an optimization algorithm involving more than two stages, with each stage involving the use of a respective machine learning model or models, may be employed.

In at least one embodiment, the selected optimization algorithm for generating features for a meta-model may comprise executing a machine learning algorithm that generates some internal values (e.g., weights assigned to respective attributes of a record at a hidden layer of simple neural-network-based model) prior to its final predictions. A subset or all of the internal values may be selected as features for the meta-model in at least some embodiments.

Methods for Generating and Using Meta-Models

FIG. 6 is a flow diagram illustrating aspects of operations that may be performed to generate and utilize meta-models for predicting the quality of results of machine learning models on different input record groups, according to at least some embodiments. As shown in element 601, result quality metrics (RQMs) of a plurality of machine learning (ML) tasks or experiments may be obtained, e.g., via programmatic interfaces of an analytics service similar in functionality to analytics service 102 of FIG. 1. Each of the tasks may involve providing respective record groups (RGs) of an input data set to one or more candidate ML models (CMs) with a common high-level objective. The RGs may have been generated by diverse sources distributed around the world, and may differ from one another in various properties such as missing attribute values, accuracy of attribute values, etc.

An optimization algorithm (OA1) to be used to generate features representing RGs may be determined, e.g., at the analytics service (element 604). An objective or goal of the optimization algorithm may be expressed, for example, in terms of a loss function or cost function which is to be minimized in some embodiments. OA1 may, for example, be selected by a client from a set of choices presented by the analytics service based on the high-level objective or problem domain, or may be indicated by a client without any options being provided. In at least some embodiments, executing the optimization algorithm may comprise running one or more machine learning models, and the optimization involved may comprise minimizing the loss functions or error functions of the machine learning models. In at least some embodiments, yet another machine learning model may be used to provide recommendations for the optimization algorithm itself. For example, a descriptor of the problem domain, the RG contents, and the CMs may be provided to such a model, and the output of the model (which may be trained using a knowledge base of an analytics service, which indicates types of optimization algorithms which have been successfully used for meta-feature generation in the past for various machine learning applications and problem domains) may indicate one or more optimization algorithms which can be be used to generate RG features.

The chosen optimization algorithm OA1 may be applied to the RGs to obtain intermediate optimization results (IORs) (element 607), e.g., representing on-linear learned transformations of the RG records into a particular data space corresponding to the kind of optimization being performed. A statistical analysis of the IORs and the attributes of the corresponding RG records may be performed in at least some embodiments to obtain optimization-based statistical features (OSFs) representing the RGs (element 610).

A training data set comprising the OSFs may be prepared for a meta-model which is to be used to predict ranges of RQMs for RG-CM combinations (element 613) in the depicted embodiment. For a given RG-CM combination, the training input may comprise, for example, the OSFs obtained for the RG, features based on data quality metrics (representing data sparsity, duplications, erroneous or inconsistent attribute values, etc.) of the input data, features representing characteristics of the CMs (e.g., comprising learned embeddings), features represent the execution environments of the CMs, and so on in different embodiments.

The meta-model may be trained using the training data set, and a trained version of the model may be stored (element 616) in various embodiments. During training, in some embodiments the meta-model may utilize several different lower-level result quality prediction machine learning models and hyper-parameter combinations to generate respective RQM predictions. In effect, experiments may be conducted with several different result quality prediction models and associated hyper-parameters to determine how well these result quality prediction models can predict the quality of the candidate models' results. In such embodiments, the trained version of the meta-model may use a selected subset of the lower-level models and the hyper-parameter combinations which provided the best predictions. For example, consider an example scenario in which the meta-model is to comprise a binary classifier to predict whether a given RG-CM combination is going to produce results with a precision above a threshold P for record pair matching. In such a scenario, logistic regression models with L1 and L2 regularization, as well as random forest models with respective combinations of hyper-parameters may be tried out during meta-model training; such models may be referred to as base meta-models. Some number of cross evaluation and cross validation runs may be used to identify the best-performing of the base meta-models and the corresponding hyper-parameters. Only one of the base meta-models may then be retained in the trained version of the meta-model in some implementations involving experimentation with multiple such base meta-models. In other embodiments, the trained meta-model may comprise an ensemble of lower-level models.

In response to a query indicating a target ML task to be performed on a new record group NRG (not part of the original input data set which was used for generating the OSFs), the trained meta-model may be used to provide one or more types of results (element 619). The results may include, for example, (a) an indication of a particular CM whose predicted RQMs for the NRG are expected to be within a particular range, (b) reasons, obtained based on analysis of the optimization algorithm's results, why various CMs may not perform well for NRG, (c) recommendations on improving data quality of RGs to help improve CM results, and/or (d) recommendations for improving CMs in some embodiments.

It is noted that in various embodiments, some of the operations shown in the flow diagram of FIG. 6 may be implemented in a different order than that shown in the figure, or may be performed in parallel rather than sequentially. Additionally, some of the operations shown in FIG. 6 may not be required in one or more implementations.

Example Programmatic Interactions

Figure 7:
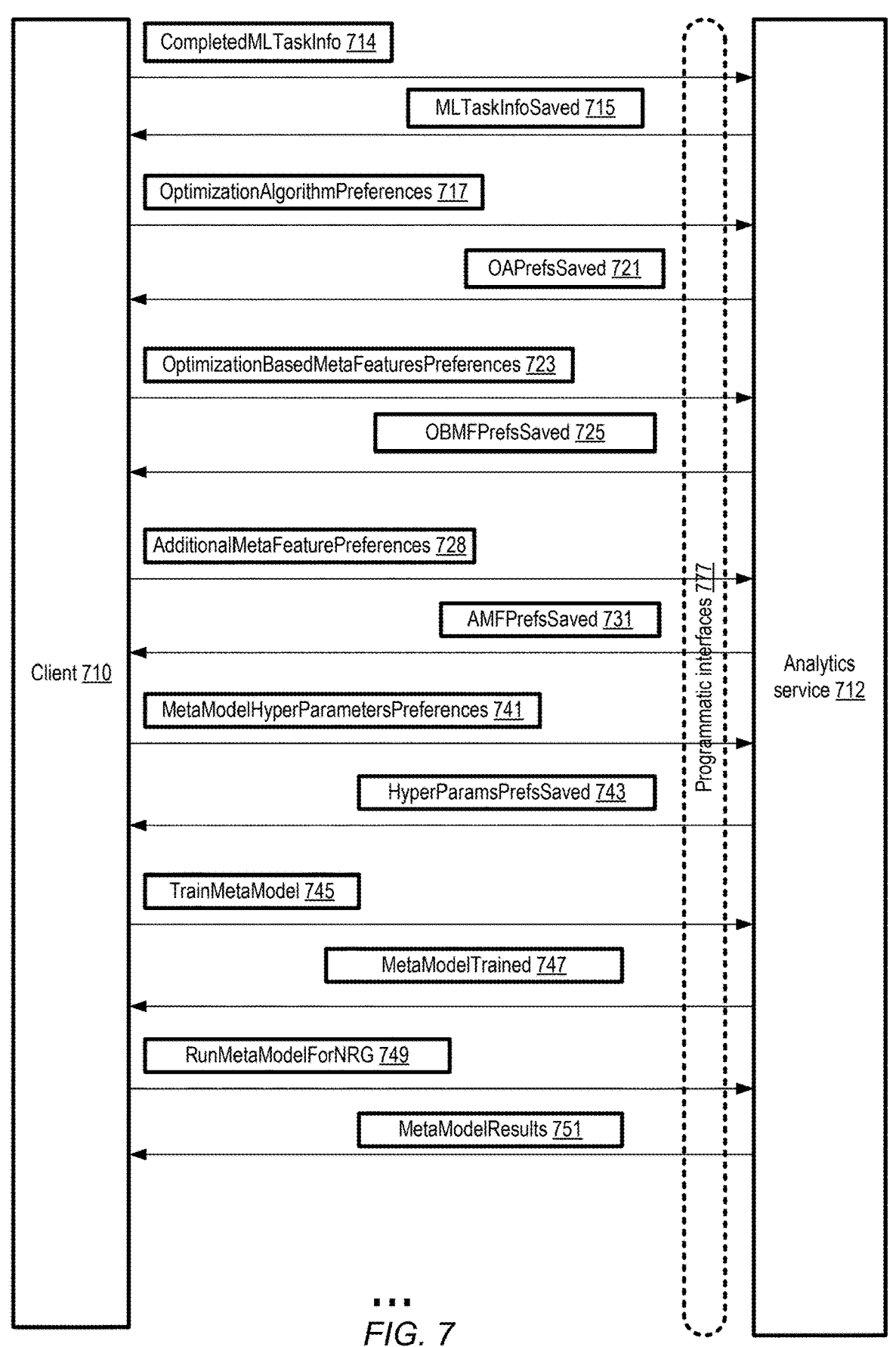
FIG. 7 illustrates example programmatic interactions pertaining to meta-model preparation and use, according to at least some embodiments.

FIG. 7 illustrates example programmatic interactions pertaining to meta-model preparation and use, according to at least some embodiments. In the depicted embodiment, an analytics service 712, similar in functionality to analytics service 102 of FIG. 1, may implement a set of programmatic interfaces 777, such as one or more web-based consoles, APIs, command-line tools, graphical user interfaces and the like. Using the programmatic interfaces 777, a client 710 of the analytics service may submit a CompletedMLTaskInfo message 714 indicating saved information about machine learning tasks which have been conducted, including the candidate machine learning algorithms which were used to process record groups, the quality of the results obtained for each of the tasks, and so on. The provided information may be stored at a repository of the analytics service and an MLTaskInfoSaved message 715 may be sent back to the client in some embodiments.

In some embodiments, a client 710 may provide information about the kinds of optimization algorithms to be used for preparing a meta-model using the task information, e.g., via an OptimizationAlgorithmPreferences message 717. For example, the client may indicate whether a single-stage optimization algorithm is to be used (such as a simpler alternative machine learning model which attempts to solve the same kind of problem represented in the ML tasks using a less sophisticated approach) or a multi-stage optimization algorithm is to be used, specifics regarding the machine learning algorithm(s) to be used for the optimization, and so on. The preferences of the client regarding the optimization algorithm may be stored at the analytics service 712, and an OAPrefsSaved message 721 may be sent to the client in the depicted embodiment.

A client 710 may provide preferences regarding the manner in which the results of the optimization are to be converted into meta-features for the meta-model, e.g., via one or more OptimizationBasedMetaFeaturesPreferences messages 723. Such a message may indicate, for example, the kinds of statistical algorithms to be used to generate meta-features from the optimization results and the attributes of the record group records, how the statistics are to be mapped to specific numeric or categorical feature values, and so on. The client's preferences regarding the optimization-based features may be stored, and an OBMFPrefsSaved message 725 may be transmitted to the client in the depicted embodiment.

Preferences or guidance about the other meta-features to be generated, such as meta-features based on input data quality, characteristics of the candidate models and associated hyper-parameters, execution environments and the like may be provided by a client via one or more Additional-MetaFeaturePreferences messages 728 in some embodiments. Such a message may indicate, for example, the specific input data quality metrics to be used for features, embedding algorithms to be used for transforming candidate model metadata into features, and so on. The client's preferences regarding the additional meta-features may be stored at a repository, and an AMFPrefsSaved message 731 may be sent to the client 710 in some embodiments.

In some embodiments, a client may indicate values for one or more hyper-parameters of the meta-model itself, e.g., via a MeteModelHyperParametersPreferences message 741. Such hyper-parameters may include, for example, types of lower-level models (such as logistic regression or random forests) to be tried during the training of the mete-model, mapping functions to be applied to the result quality metrics included in the completed task information (which was indicated in the CompletedMLTaskInfo message) to generate labels for the training data of the meta-model, and so on. The provided hyper-parameters may be stored at the analytics service and a HyperParamsPrefsSaved message 743 may be sent to the client in the depicted embodiment.

A client may request the initiation of the training if the meta-model via a TrainMetaModel request 745 in some embodiments. In at least one embodiment, the client may only provide a data set representing the completed machine learning tasks (e.g., via a CompletedMLTaskInfo message), and this may trigger the workflow of generating features and training the meta-model. As such, the client need not necessarily provide any additional information such as optimization algorithm preferences, meta-feature-related preferences, or hyper-parameters in some embodiments; in such cases, the analytics service may make decisions regarding these aspects of the meta-learning procedure on behalf of the client without requiring direct guidance. After the meta-model has been trained, e.g., in response to the receipt of the completed task information, or in response to a TrainMeta- Model request 745, a trained version of the meta-model may be stored and a MetaModelTrained message 747 may be sent to the client in some embodiments.

A client may specify a new record group (NRG) comprising one or more records for which recommendations are to be provided by the analytics service using the trained version of the meta-model in various embodiments by submitting the equivalent of a RunMetaModelForNRG request 749 in the depicted embodiment. In response, respective feature sets corresponding to the combination of the NRG and one or more if the candidate models may be generated and provided as input to the trained version of the meta-model. The output of the meta-model with respect to the NRG may be provided to the client via one or more MetaModelResults messages 751 in various embodiments. Such output may include, for example, an indication of the particular candidate model which is most likely to provide prediction results quality in a desired range (e.g., precision greater than 95%) for NRG may be provided, or a list of candidate models ranked in order of decreasing predicted quality results may be provided. In at least some embodiments, the analytics service may be able to infer or generate some recommendations for improving the data quality of NRG and/or other record groups by analyzing the results of the meta-model—e.g., the results of the meta-model may indicate that many or all of the candidate models tend to perform poorly on input data in which the number of missing attributes of text attributes exceeds N, so the analytics service may recommend that the sources of record groups be encouraged to reduce the number of text attributes with null or missing values. Similarly, in some embodiments the analytics service may be able to infer or generate some recommendations for modifying some of the candidate models by analyzing the results of the meta-model—e.g., it may be possible to deduce that neural network models in which the dimensionality of hidden layers exceeds D tend to perform less well than neural network models with hidden layers with smaller dimensionality on input data similar to NRG, so the analytics service may recommend that the dimensionality of such layers be reduced for some models. Such recommendations may also be provided in the Meta-ModelResults messages 751 in at least one embodiment.

It is noted that in some embodiments, programmatic interactions other than those shown in FIG. 7 may be supported by an analytics service 712. In at least one embodiments, some of the types of programmatic interactions shown in FIG. 7 may not be supported.
Example Graphical User Interfaces FIG. 8 and FIG. 9 illustrates example graphical user interfaces which may be used to train and execute meta-models, according to at least some embodiments. Web-based interface 802 of FIG. 8 may be used by a client of an analytics service to provide guidance regarding the training of a meta-model, while web-based interface 902 of FIG. 9 may be utilized to obtain results for a record group from a trained meta-model in some embodiments. Message area 877 of web-based interface 802 may summarize the manner in which a client of an analytics service similar in functionality to analytics service 102 of FIG. 1 can utilize the interface to provide sufficient data and metadata to enable a meta-model ton trained.

A high-level task objective 803, such as record-pair match detection 804 may be part of the metadata provided by the client in the depicted embodiment. Information about the objective may, for example, be used to look up entries in a knowledge base indicating optimization algorithms which were successfully used for generating meta-features to predict result quality of ML models with similar objectives in the past. In at least one embodiment, the analytics service may utilize a natural language processing to obtain a vector representation of the high-level task objective, and perform similarity analysis with respect to similarly-generated vector representations of other objectives for which meta-models have been trained in the past to select appropriate optimization algorithms for the current objective.

A client may provide an indication of an input data set 805 representing the machine learning tasks for which results are already available via interface 802 in the depicted embodiment. For example, a container of objects within a storage service of a provider network may be indicated as the location of the input data set via element 807 of the web-based interface.

In the embodiment depicted in FIG. 8, the analytics service may select a number of candidate optimization algorithms 812 (e.g., based on analysis of the high-level task objective information), from among which the client may select one via a dropdown menu as indicated by icon 878. For each of the suggested optimization algorithms such as token-match algorithm 814, the client may obtain additional details by clicking on an associated link. A default optimization algorithm selected by the analytics service may be shown in element 814 in some embodiments, and utilized to obtain features for the meta-model unless the client provides input to change the default. In at least some embodiments, as indicated in the message area, the client may enter custom values for various elements of the metadata pertaining to the ML tasks, including a custom optimization algorithm which may not be among the candidate optimization algorithms selected by the analytics service.

For some of the metadata elements, a client may elect to let the analytics service make the decisions, instead of choosing or specifying a particular option. For example, the type of lower level result quality prediction model(s) to be used in the meta-model may be specified by the client if desired via the meta-model type field 818 in the depicted embodiment. If the client wishes to use a specific type of meta-model from among a set of models proposed by the analytics service, the drop-down menu element associated with field 818 may be used; alternatively, the client may leave the default "Allow service to choose" option 820 in effect. Similarly, if the client wishes to provide meta-model hyper-parameter settings 824, the hyper-parameters may be specified via element 826; otherwise, the default option of allowing the analytics service to choose may remain in effect.

In some embodiments, the analytics service may enable the client to provide meta-model training constraints 830, such as "Train within 7 days" as shown in element 832. Such resource constraints may be used to determine, for example, the kinds of computing servers to be used, the number of meta-model training iterations to be conducted, etc. Other types of metadata which can be used to control various aspects of the meta-model preparation may also be provided via an interface similar to web-based interface 802 in some embodiments.

In the embodiment depicted in FIG. 8, a client may use the "Save" interface element 866 to save the settings entered thus far by the client, and the "Start meta-model training" interface element 868 may be used to initiate feature generation and training of the meta-model. The status of the training procedure (e.g., "Not yet started", "In-progress", "Completed", etc.) for the meta-model may be displayed and updated dynamically via element 869. If the training has been completed and the client wishes to run the trained version of the meta-model, the interface element 873 may be used to execute the model for any desired set of input records.

In some embodiments, a web-based interface 902 of FIG. 9 may be presented to a client of an analytics service in response to a request to run a trained meta-model (e.g., a request submitted using interface element 873 of FIG. 8). Message area 977 may inform the client that information about the target record group for which a recommended candidate machine learning model, as well as the desired results quality range, is to be provided in order to execute the trained meta-model. Information about the high-level task objective (such as record-pair match detection) may be re-shown via elements 903 and 904 of interface 902. The input data set which was used to train the meta-model may be indicated via elements 905 and 907 in the depicted embodiment.

The client may provide information about the target record group 909 for which one or more types of recommendations are desired in interface element 911, e.g., by providing a storage service object or container identifier such as "<StorageServiceURL>/<NRG1Container>", one or more file names, or the like. The target results quality range 913 (e.g., "Precision>0.9") for which a candidate model is to be identified may be entered by the client in interface element 915.

The meta-model may be executed in response to a request submitted via element 917 in the depicted embodiment. A feature set corresponding to the target record group may be generated and provided as input to the meta-model.

Several different types of results obtained by executing the meta-model with respect to the target record group may be presented via interface 902. For example, a recommended candidate model 922 (e.g., "CM24" 968) may be shown, along with a link usable to view the predicted range of quality results of the recommended candidate model. In at least some embodiments, more than one of the candidate models may be able to provide the targeted range of quality results, and interface element 924 may enable the client to view the list of other acceptable candidate models. Interface element 927 may be used to view a list of input data quality improvement recommendations, which may help the client to prepare input data sets more likely to lead to high quality predictions in the future, and/or lead to an improvement in the quality of the meta-model's own predictions. A list of proposed recommendations to improve the candidate models may be made accessible via interface element 930 in the depicted embodiment. The client may utilize interface element 933, if desired, to view detailed explanations for the quality of candidate model results. Recommendations provided via elements 927 and 930, as well as detailed explanations obtained via element 933, may be based in some embodiments on correlation and other types of statistical analysis—e.g., the analytics service may be able to characterize the distinctions between record groups for which high quality results can be obtained by a given candidate model, and the record groups for which poorer results are obtained from that model, based on statistics on attributes or attribute combinations of the record groups. Other types of output and/or interface elements may be provided in some embodiments.

Example Provider Network Environment

Figure 10:
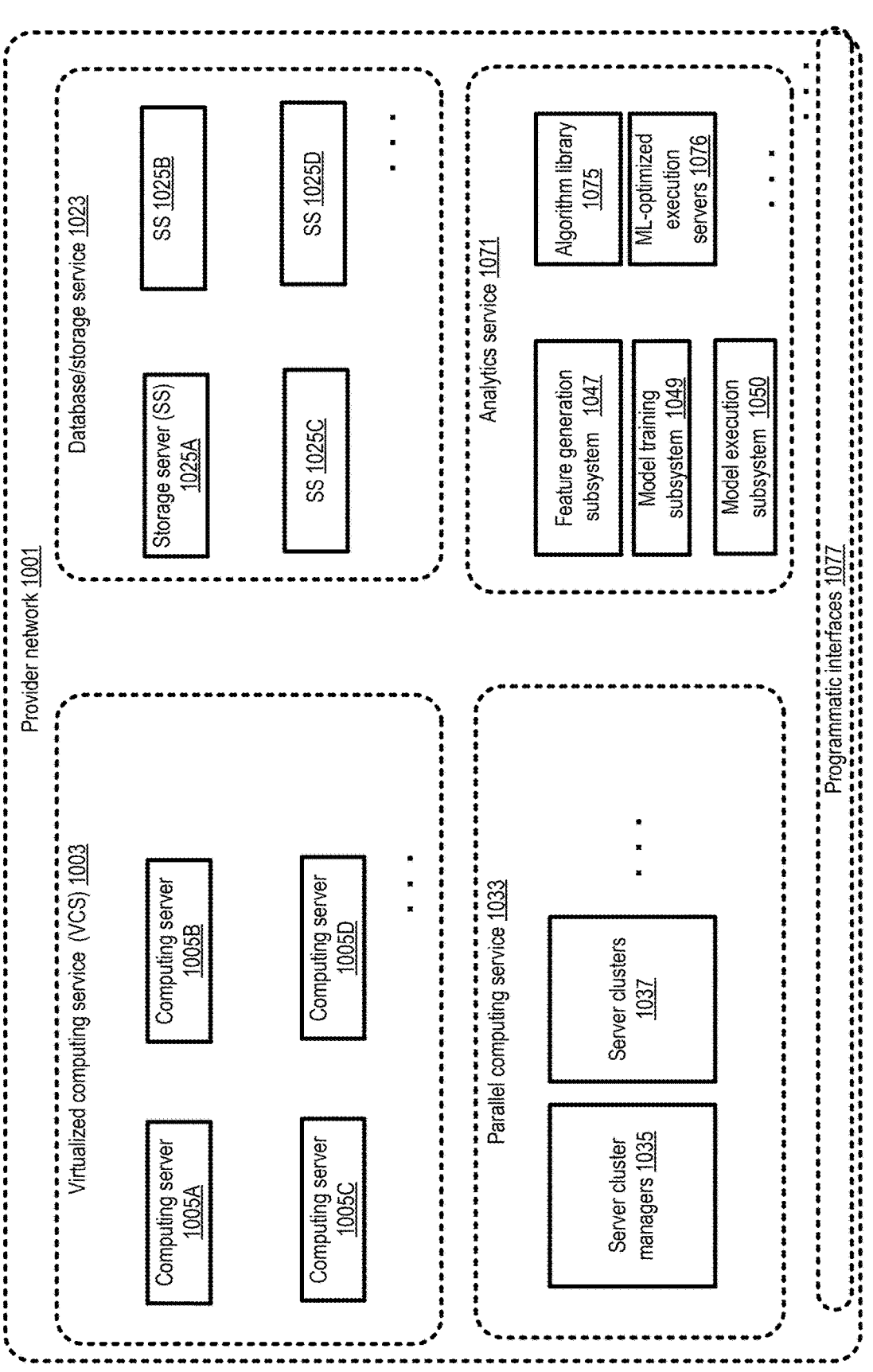
FIG. 10 illustrates an example provider network environment in which an analytics service providing meta-models for predicting performance of machine learning models may be implemented, according to at least some embodiments.

In some embodiments, as mentioned earlier, an analytics service at which meta-learning techniques similar to those described above are supported may be implemented at a provider network. FIG. 10 illustrates an example provider network environment in which an analytics service providing meta-models for predicting performance of machine learning models may be implemented, according to at least some embodiments. In the depicted embodiment, provider network 1001 may comprise resources used to implement a plurality of services, including for example a virtualized computing service (VCS) 1003, a database/storage service 1023, and a parallel computing service 1033 as well as an analytics/machine learning service 1071 within which meta-models may be developed and run. The analytics service 1071, which may also be referred to as a machine learning service or an artificial intelligence service, in turn may comprise algorithm library 1075, a feature generation subsystem 1047 (at which meta-features similar to those discussed above may be generated from available task results and optimization algorithms), model training subsystem 1049 at which various candidate models and meta-models may be trained and re-trained using algorithms from library 1075, model execution subsystem 1050 at which the models and meta-models are executed, and machine learning-optimized execution servers 1076 in the depicted embodiment. The parallel computing service 1033 may comprise various server clusters 1037, each comprising a plurality of servers, on which parallelizable workloads may be distributed by a set of server cluster managers 1035 in the depicted embodiment. Some of the algorithms implemented at the analytics service 1071 may be parallelizable, and may utilize the server clusters 1037 in at least some embodiments.

Components of a given service may utilize components of other services in the depicted embodiment—e.g., for some analytics service tasks, virtual machines implemented at computing servers such as 1005A-1005D of the virtualized computing service 1003 may be used, server clusters 1037 and/or cluster managers 1035 may be utilized for parallelizable computations of the analytics service, input data and/or output produced at the analytics service may be stored at storage servers 1025 (e.g., 1025A-1025D) of storage service 1023, and so on. Individual ones of the services shown in FIG. 10 may implement a respective set of programmatic interfaces 1077 which can be used by external and/or internal clients (where the internal clients may comprise components of other services) in the depicted embodiment.

In some embodiments, at least some aspects of the meta-learning techniques described herein may be implemented without acquiring resources of network-accessible services such as those shown in FIG. 10. For example, a standalone tool implemented at one or more computing devices which are not part of a network-accessible service may be used in one embodiment.

Use Cases

The techniques described above, of training and executing meta-models to predict the performance of various candidate machine learning models for a variety of tasks and applications may be extremely beneficial in a variety of scenarios. For example, many industrial-scale applications, such as catalog management applications of large stores which sell millions of items, may have extremely large data sets which are to be processed using machine learning, with a high degree of heterogeneity among the records of the data sets. For such applications, many different machine learning models may be trained and used with respective subsets of the data sets. When predictions have to be generated for records which have not been encountered earlier, re-running all the different models available may be extremely resource-intensive. Using the meta-model, the most appropriate model from the available models may be identified very efficiently.

Illustrative Computer System

Figure 11:
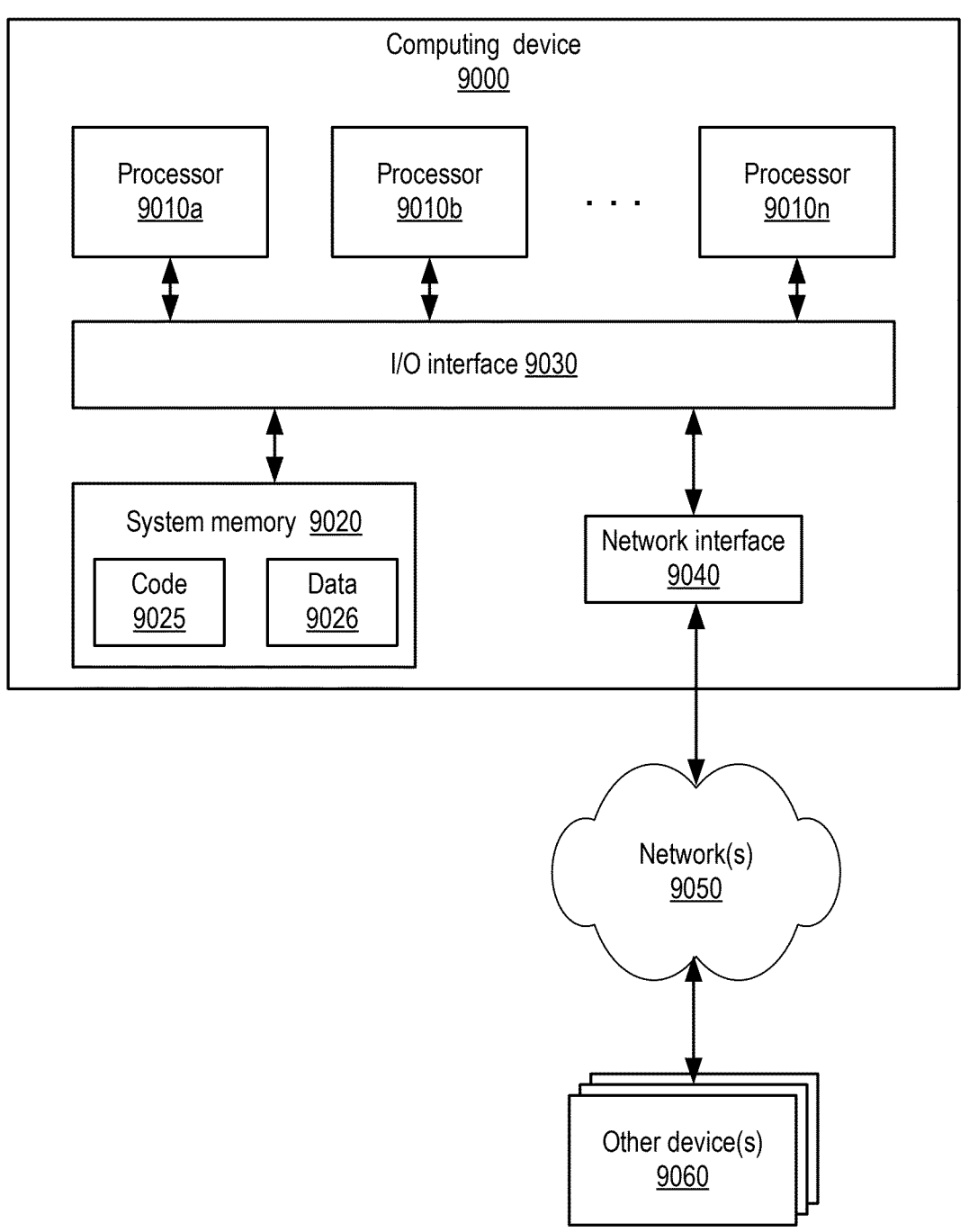
FIG. 11 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
obtain respective result quality metrics of a plurality of machine learning tasks, wherein individual ones of the plurality of machine learning tasks comprise providing respective record groups of a plurality of record groups as input to one or more machine learning models of a plurality of machine learning models, the one or more machine learning models to generate results to an inference problem for individual records, wherein individual ones of the record groups comprise one or more records;
determine an optimization algorithm to be used to generate one or more features representing individual record groups of the plurality of record groups, wherein an objective of the optimization algorithm is expressed via a loss function;
obtain, based at least in part on applying the optimization algorithm to individual records of the plurality of record groups, respective sets of intermediate optimization results corresponding to individual ones of the record groups and distinct from the results of the one or more machine learning models, including a first set of intermediate optimization results corresponding to a first record group of the plurality of record groups, wherein the first set of intermediate optimization results comprises alternative results to the same inference problem for which the one or more machine learning models generated results for individual records of the first record group, wherein the first set of intermediate optimization results comprises one or more non-linear learned transformations of individual records of the first record group;
generate, using statistical analysis of at least the first set of intermediate optimization results distinct from the results of the one or more machine learning models and the individual records of the first record group, one or more statistical features representing the first record group;
prepare a training data set of a meta-model for predicting respective result quality metrics ranges associated with respective record-group-and-model combinations, wherein the training data set includes, with respect to a combination of the first record group and a first machine learning model of the plurality of machine learning models, at least (a) one or more data properties of the first record group, and (b) the one or more statistical features;

train the meta-model using at least the training data set; and in response to a query indicating a target machine learning task to be performed on a new record group which was not part of the plurality of record groups, execute a trained version of the meta-model to provide (a) an indication of a particular machine learning model of the plurality of machine learning models whose predicted result quality metrics with respect to the target machine learning task are within a particular range and (b) an explanation of the predicted result quality metrics based on alternative results generated by the optimization algorithm for the new record group.

2. The system as recited in claim 1, wherein the training data set further includes, with respect to the combination of the first record group and the first machine learning model, an encoding representing the first machine learning model.

3. The system as recited in claim 1, wherein to determine the optimization algorithm, the one or more computing devices include further instructions that upon execution on or across the one or more computing devices further cause the one or more computing devices to:

analyze input obtained via one or more programmatic interfaces of an analytics service of a provider network.

4. The system as recited in claim 1, wherein to determine the optimization algorithm, the one or more computing devices include further instructions that upon execution on or across the one or more computing devices further cause the one or more computing devices to:

examine one or more records of a knowledge base of an analytics service.

5. The system as recited in claim 1, wherein to train the meta-model, the one or more computing devices include further instructions that upon execution on or across the one or more computing devices further cause the one or more computing devices to:

conduct a plurality of experiments with respective result quality prediction machine learning models of a plurality of result quality prediction machine learning models, wherein individual ones of the experiments comprise using a respective set of hyper-parameters; and select a particular result quality prediction machine learning model of the respective result quality prediction machine learning models to be used to predict result quality metrics after the training is terminated, wherein the indication of the particular machine learning model whose predicted result quality metrics with respect to the target machine learning task are within the particular range is obtained using the particular result quality prediction machine learning model.

6. A computer-implemented method, comprising:

obtaining respective result quality metrics of a plurality of machine learning tasks performed using a first set of one or more machine learning models on a first data set comprising a plurality of record groups, wherein a first machine learning task of the plurality of machine learning tasks comprises providing a first record group of the plurality of record groups to a first machine learning model of the first set to generate results to an inference problem for individual records of the first record group;

determining, based at least in part on applying a first optimization algorithm to individual records of the plurality of record groups, respective sets of intermediary results corresponding to individual ones of the record groups and distinct from the results of the first machine learning model, wherein a first set of intermediary results comprises alternative results to the same inference problem for which the first machine learning model generated results for the individual records of the first record group, wherein the first set of intermediate results comprises one or more non-linear learned transformations of individual records of the first record group;

preparing a training data set for a meta-model for predicting respective result quality metrics ranges associated with respective record-group-and-model combinations, wherein the training data set includes, with respect to a combination of the first record group and a first machine learning model, at least (a) one or more data quality features of the first record group, and (b) one or more statistical features obtained from the first set of intermediary results;

training the meta-model using at least the training data set; and executing a trained version of the meta-model to provide (a) an indication of a predicted result quality metric range of a particular machine learning model of the first set of one or more machine learning models with respect to a machine learning task on a particular record group which was not part of the first data set and (b) an explanation of the predicted result quality metrics based on alternative results generated by the optimization algorithm for the particular record group.

7. The computer-implemented method as recited in claim 6, wherein applying the first optimization algorithm comprises executing an auxiliary machine learning model which is not in the first set of one or more machine learning models.

8. The computer-implemented method as recited in claim 6, wherein the first optimization algorithm comprises a plurality of stages including a first stage and a second stage, the computer-implemented method further comprising:

obtaining, in the first stage, via a first auxiliary machine learning model which is not in the first set of one or more machine learning models, respective results corresponding to individual records of one or more record groups of the plurality of record groups; and training, using another training data set comprising labels derived from the respective results, a second auxiliary machine learning model which is not in the first set of one or more machine learning models, wherein the second stage comprises executing a trained version of the second auxiliary machine learning model, and wherein the first set of intermediary results comprises at least some results obtained from the trained version of the second auxiliary machine learning model.

9. The computer-implemented method as recited in claim 6, further comprising:

obtaining, via one or more programmatic interfaces of an analytics service, metadata pertaining to the plurality of machine learning tasks, wherein the metadata indicates an objective of at least the first machine learning task;

identifying, by the analytics service, based at least in part on the metadata, one or more candidate optimization algorithms for preparing at least a portion of the training data set, wherein the one or more candidate optimization algorithms include the first optimization algorithm; and obtaining, at the analytics service via the one or more programmatic interfaces, an indication that the first optimization algorithm has been selected to prepare at least a portion of the training data set.

10. The computer-implemented method as recited in claim 6, further comprising:

obtaining, via a programmatic interface, an indication of the first optimization algorithm.

11. The computer-implemented method as recited in claim 6, further comprising:

identifying, at an analytics service, one or more statistical algorithms for analyzing the first set of intermediary results, wherein the one or more statistical features are obtained from the one or more statistical algorithms.

12. The computer-implemented method as recited in claim 6, wherein the training data set further includes, with respect to the combination of the first record group and the first machine learning model, an encoding representing the first machine learning model.

13. The computer-implemented method as recited in claim 6, wherein the training data set further includes, with respect to the combination of the first record group and the first machine learning model, an encoding representing one or more resources used to train or execute the first machine learning model.

14. The computer-implemented method as recited in claim 6, further comprising:

providing, based at least in part on statistical analysis of results obtained from the meta-model, a recommendation for one or more changes to record groups provided as input to one or more of (a) the meta-model or (b) individual ones of the first set of one or more machine learning models to improve one or more result quality metrics associated with the record groups.

15. The computer-implemented method as recited in claim 6, further comprising:

providing, based at least in part on statistical analysis of results obtained from the meta-model, a recommendation for one or more change to a particular machine learning model of the first set of one or more machine learning models to improve one or more result quality metrics of the particular machine learning model.

16. One or more non-transitory computer-accessible storage media storing program instructions that when executed on or across one or more processors cause the one or more processors to:

obtain respective result quality metrics of a plurality of machine learning tasks performed using one or more machine learning models on a first data set comprising a plurality of record groups, wherein a first machine learning task of the plurality of machine learning tasks comprises providing a first record group of the plurality of record groups to a first machine learning model, the first machine learning model to generate results to an inference problem for individual records of the first record group;

determine, based at least in part on applying an algorithm to individual records of the plurality of record groups, respective sets of intermediary results corresponding to individual ones of the record groups and distinct from the results of the first machine learning model, wherein a first set of intermediary results comprises alternative results to the same inference problem for which the first machine learning model generated results for the individual records of the first record group, wherein the first set of intermediate results comprises one or more non-linear learned transformations of the individual records of the first record group;

train a meta-model for predicting respective result quality metrics ranges associated with respective record-group-and-model combinations, wherein a training data set used for training the meta-model includes, for a combination of the first record group and a first machine learning model, one or more statistical features obtained from the first set of intermediary results;

store a trained version of the meta-model; and execute the trained version of the meta-model to provide (a) an indication of a predicted result quality metric range of the first machine learning model with respect to a machine learning task on a particular record group which was not part of the first data set and (b) an explanation of the predicted result quality metrics based on alternative results generated by the algorithm for the particular record group.

17. The one or more non-transitory computer-accessible storage media as recited in claim 16, wherein applying the algorithm comprises executing a machine learning model which was not utilized in the plurality of machine learning tasks.

18. The one or more non-transitory computer-accessible storage media as recited in claim 16, wherein the algorithm comprises a plurality of stages including a first stage and a second stage, wherein the one or more non-transitory computer-accessible storage media store further program instructions that when executed on or across the one or more processors further cause the one or more processors to:

obtain, in the first stage, via a first auxiliary machine learning model, respective results corresponding to individual records of one or more record groups of the plurality of record groups; and train a second auxiliary machine learning model using another training data set comprising labels derived from the respective results, wherein the second stage comprises executing a trained version of the second auxiliary machine learning model, and wherein the first set of intermediary results comprises at least some results obtained from the trained version of the second auxiliary machine learning model.

19. The one or more non-transitory computer-accessible storage media as recited in claim 16, wherein the one or more non-transitory computer-accessible storage media store further program instructions that when executed on or across the one or more processors further cause the one or more processors to:

obtain, via one or more programmatic interfaces of an analytics service, metadata pertaining to the plurality of machine learning tasks, wherein the metadata indicates an objective of at least the first machine learning task;

identify, by the analytics service, based at least in part on the metadata, one or more candidate algorithms for preparing at least a portion of the training data set, wherein the one or more candidate algorithms include the algorithm; and obtain, at the analytics service via the one or more programmatic interfaces, an indication that the algorithm has been selected to prepare at least a portion of the training data set.

20. The one or more non-transitory computer-accessible storage media as recited in claim 16, wherein the one or more non-transitory computer-accessible storage media store further program instructions that when executed on or across the one or more processors further cause the one or more processors to:

obtain, from the trained version of the model, (a) a first result quality metrics range predicted for a first tuning parameter setting of the first machine learning model and (b) a second result quality metrics range predicted for a second tuning parameter setting of the first machine learning model; and provide, based at least in part on an analysis of the first and second result quality metrics ranges, a recommendation for one or more tuning parameter settings the first machine learning model to improve one or more result quality metrics of the first machine learning model.

* * * * *